United States Patent
Ogawa

(10) Patent No.: US 10,286,762 B2
(45) Date of Patent: May 14, 2019

(54) VEHICLE DOOR STRUCTURE

(71) Applicant: TOYOTA JIDOSHA KABUSHIKI KAISHA, Toyota-shi, Aichi-ken (JP)

(72) Inventor: Satoshi Ogawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 326 days.

(21) Appl. No.: 15/196,525

(22) Filed: Jun. 29, 2016

(65) Prior Publication Data
US 2017/0036521 A1 Feb. 9, 2017

(30) Foreign Application Priority Data
Aug. 7, 2015 (JP) .................. 2015-157076

(51) Int. Cl.
 *B60J 5/04* (2006.01)
 *B62D 29/04* (2006.01)
(52) U.S. Cl.
 CPC ............ *B60J 5/0456* (2013.01); *B60J 5/045* (2013.01); *B60J 5/0425* (2013.01); *B60J 5/0426* (2013.01); *B60J 5/0431* (2013.01); *B60J 5/0433* (2013.01); *B60J 5/0434* (2013.01); *B60J 5/0447* (2013.01); *B60J 5/0469* (2013.01); *B60J 5/0481* (2013.01); *B62D 29/04* (2013.01)
(58) Field of Classification Search
 CPC ...... B60J 5/0412; B60J 5/0413; B60J 5/0415; B60J 5/0416; B60J 5/042; B60J 5/0422; B60J 5/0423; B60J 5/0425; B60J 5/0426; B60J 5/0427; B60J 5/0431; B60J 5/0433; B60J 5/0434; B60J 5/0437; B60J 5/0443; B60J 5/048; B60J 5/0481; B60J 5/0483; B60J 5/0484
 See application file for complete search history.

(56) References Cited

U.S. PATENT DOCUMENTS

| 4,241,542 | A | * | 12/1980 | Podolan | ................ E05F 11/382 49/352 |
| 4,306,381 | A | | 12/1981 | Presto | |
| 4,845,894 | A | * | 7/1989 | Herringshaw | ......... B60J 5/0416 49/502 |
| 4,850,636 | A | * | 7/1989 | McLaren | ............... B60J 5/0437 296/146.5 |

(Continued)

FOREIGN PATENT DOCUMENTS

JP 04004893 Y * 2/1992
JP H10-035285 A 2/1998
(Continued)

*Primary Examiner* — Hilary L Gutman
(74) *Attorney, Agent, or Firm* — Oliff PLC

(57) ABSTRACT

A vehicle door structure includes: a metal door outer panel that includes an outermost design surface of a vehicle door; a metal annular reinforcement that (i) is provided at a door inner side of the door outer panel, (ii) has an annular shape so as to extend along an outer peripheral portion of the door outer panel, and (iii) is joined to the outer peripheral portion of the door outer panel; at least one reinforcing member that extends in a door longitudinal direction and that is joined to the annular reinforcement; and a fiber-reinforced door inner panel that is provided at a door inner side of the annular reinforcement, and is fastened to the annular reinforcement.

13 Claims, 14 Drawing Sheets

(56) References Cited

U.S. PATENT DOCUMENTS

| | | | | |
|---|---|---|---|---|
| 4,945,682 A * | 8/1990 | Altman | ................... | B60J 5/0405 |
| | | | | 296/146.5 |
| 5,054,238 A * | 10/1991 | Glossop, Jr. | ................ | B60J 1/17 |
| | | | | 49/211 |
| 5,095,659 A | 3/1992 | Benoit et al. | | |
| 5,417,470 A * | 5/1995 | Holt | ....................... | B60J 5/0416 |
| | | | | 296/146.6 |
| 5,785,378 A | 7/1998 | Seefried et al. | | |
| 6,364,398 B1 * | 4/2002 | Kim | ....................... | B60J 5/0443 |
| | | | | 296/146.6 |
| 6,390,533 B1 * | 5/2002 | Furuse | ................... | B60J 5/0425 |
| | | | | 296/146.5 |
| 6,478,364 B2 * | 11/2002 | Gerber | ................... | B60J 5/0426 |
| | | | | 296/146.5 |
| 6,571,515 B1 * | 6/2003 | Samways | ............... | B60J 5/0416 |
| | | | | 49/352 |
| 8,510,997 B2 * | 8/2013 | Nakamori | .............. | B60J 5/0425 |
| | | | | 296/146.6 |
| 9,815,353 B2 * | 11/2017 | Jang | ......................... | B60J 5/048 |
| 2004/0104593 A1 | 6/2004 | Nakagawa | | |
| 2007/0210612 A1 * | 9/2007 | Kidachi | ................. | B60J 5/0418 |
| | | | | 296/146.6 |
| 2014/0144973 A1 | 5/2014 | Pohl et al. | | |
| 2017/0174052 A1 * | 6/2017 | Sakurai | ....................... | B60J 1/17 |
| 2017/0240029 A1 * | 8/2017 | Moriyama | ............... | B60J 5/042 |
| 2017/0240031 A1 * | 8/2017 | Moriyama | ............. | B60J 5/0412 |
| 2018/0001368 A1 * | 1/2018 | Otsuka | ................... | B21D 22/20 |
| 2018/0134130 A1 * | 5/2018 | Nagaishi | ............... | B60J 5/0481 |

FOREIGN PATENT DOCUMENTS

| | | |
|---|---|---|
| JP | 2002-240563 A | 8/2002 |
| JP | 2004-175169 A | 6/2004 |
| JP | 2009-018782 A | 1/2009 |
| JP | 2009-173079 A | 8/2009 |
| JP | 2015-027829 A | 2/2015 |
| JP | 2015-027830 A | 2/2015 |

* cited by examiner

VEHICLE DOOR STRUCTURE

CROSS-REFERENCE TO RELATED APPLICATION

This application claims priority under 35 USC 119 from Japanese Patent Application No. 2015-157076 filed Aug. 7,2015, the entire disclosure of which is incorporated by reference herein.

BACKGROUND

Technical Field

The present disclosure relates to a vehicle door structure.

Related Art

Japanese Patent Application Laid-Open (JP-A) No. 2015-027829 discloses a vehicle door structure that includes a door outer panel that is made of metal, and a door inner panel that is made of resin and that is joined by hemming to the peripheral edge portion of the door outer panel. In this vehicle door structure, joining members that are made of metal are provided at connected portions, that are connected to the vehicle main body, of the door inner panel. Due to the above structure, an attempt is made to ensure the supporting rigidity of the door with respect to the vehicle main body.

However, in the above-described related art, there is room for improvement with regard to load that is inputted to the door inner panel, made of resin, at the time of a collision of the vehicle or the like.

SUMMARY

In view of the above-described circumstances, the present disclosure provides a vehicle door structure that reduces load inputted to a door inner panel that is made of a fiber-reinforced resin, and that suppresses the occurrence of breakage at the door inner panel.

A vehicle door structure of a first aspect of the present disclosure includes: a metal door outer panel that includes an outermost design surface of a vehicle door; a metal annular reinforcement that (i) is provided at a door inner side of the door outer panel, (ii) has an annular shape so as to extend along an outer peripheral portion of the door outer panel, and (iii) is joined to the outer peripheral portion of the door outer panel; at least one reinforcing member that extends in a door longitudinal direction and that is joined to the annular reinforcement; and a fiber-reinforced resin door inner panel that is provided at a door inner side of the annular reinforcement, and is fastened to the annular reinforcement.

In the vehicle door structure of the first aspect, the annular reinforcement ("reinforcement" is abbreviated as "RF" hereinafter) that is made of metal is provided at the door inner side of the door outer panel that is made of metal and includes the outermost design surface of a vehicle door. The annular RF is formed in an annular shape so as to extend along the outer peripheral portion of the door outer panel, and is joined to the outer peripheral portion of the door outer panel. The door inner panel that is made of a fiber-reinforced resin is provided at the door inner side of the annular RF, and the door inner panel is fastened to the annular RF.

Further, at least one reinforcing member that extends in the door longitudinal direction is joined to the annular RF Therefore, at the time of a vehicle collision for example, in a case in which load is inputted to the reinforcing member that extends in the door longitudinal direction, the load can be received at the annular reinforcement that is structured from metal that is ductile. As a result, load that is inputted to the door inner panel that is made of a fiber-reinforced resin (hereinafter abbreviated as "made of FRP") is lessened, and the occurrence of breakage at the door inner panel is suppressed.

In a vehicle door structure of a second aspect of the present disclosure, which includes the first aspect, the at least one reinforcing member includes: a beltline outer reinforcement that is provided at an upper end portion of the vehicle door; and the vehicle door structure further includes a hinge retainer upper that is fixed to a front end portion of the beltline outer reinforcement, wherein the front end portion of the beltline outer reinforcement, the hinge retainer upper, the annular reinforcement, and an upper hinge that is fixed to a vehicle main body, are fastened together by a fastening member.

In the vehicle door structure of the second aspect, the front end portion of the beltline outer RF, the hinge retainer upper, the annular RF and the upper hinge that is fixed to the vehicle main body are joined together by a fastening member. Therefore, load, that is inputted to the beltline outer RF at the time of a collision, is transmitted to the vehicle main body via the upper hinge. As a result, load that is inputted to the door inner panel that is made of FRP is reduced.

In a vehicle door structure of a third aspect of the present disclosure, which includes the first aspect, the at least one reinforcing member includes: a beltline outer reinforcement that is provided at an upper end portion of the vehicle door; and the vehicle door structure further includes a metal lock reinforcement that is provided at a door outer side of a door rear portion of the door inner panel, and to which a door lock device is mounted, wherein a rear end portion of the beltline outer reinforcement, the annular reinforcement, the door inner panel and the lock reinforcement are fastened together by a fastening member.

In the vehicle door structure of the third aspect, the rear end portion of the beltline outer RF, the annular RF, the lock RF and the door inner panel are fastened together by a fastening member. Therefore, load that is inputted to the beltline outer RF at the time of a collision, is transmitted to the vehicle main body via the door lock device. As a result, load that is inputted to the door inner panel that is made of FRP is reduced.

In a vehicle door structure of a fourth aspect of the present disclosure, which includes the first aspect, the at least one reinforcing member includes: a beltline outer reinforcement that is provided at an upper end portion of the vehicle door; and the vehicle door structure further includes a metal lock reinforcement that is provided at a door outer side of a door rear portion of the door inner panel, and to which a door lock device is mounted; and a handle reinforcement that is integral with the beltline outer reinforcement, and to which an outside handle of the vehicle door is fixed, wherein the handle RF, the annular RF, the lock RF and the door inner panel are fastened together by a fastening member.

In the vehicle door structure of the fourth aspect, the beltline outer RF and the handle RF are made integral, and further, the handle RF, the annular RF, the lock RF and the door inner panel are fastened together by a fastening member. Therefore, load, that is inputted to the beltline outer RF at the time of a collision, is transmitted to the vehicle main body via the door lock device. As a result, load that is inputted to the door inner panel that is made of FRP is reduced.

In a vehicle door structure of a fifth aspect of the present disclosure, which includes the first aspect, the at least one reinforcing member includes: a dent RF that is provided at a door vertical direction intermediate portion of the vehicle door; and the vehicle door structure further includes a metal lock reinforcement that is provided at a door outer side of a door rear portion of the door inner panel, and to which a door lock device is mounted, wherein a front end portion of the dent RF is welded to the annular RF, and a rear end portion of the dent RF, the annular RF, the lock RF and the door inner panel are fastened together by a fastening member.

In the vehicle door structure of the fifth aspect, the front end portion of the dent RF is joined to the annular RF, and the rear end portion of the dent RF is fastened together with the annular RF, the lock RF and the door inner panel. Therefore, load, that is inputted to the dent RF at the time of a collision is transmitted to the vehicle main body via the door lock device. As a result, load that is inputted to the door inner panel that is made of FRP is reduced.

In a vehicle door structure of a sixth aspect of the present disclosure, which includes the first aspect, the at least one reinforcing member includes: an impact beam that is provided further downward than a door vertical direction intermediate portion of the vehicle door; and the vehicle door structure further includes a first bracket and a second bracket that are fastened to a front end portion of the impact beam; and a hinge retainer lower that is fixed to a front end portion of the first bracket, wherein the first bracket is welded to the annular RF, a front end portion of the second bracket is welded to the annular RF, and the front end portion of the first bracket, the hinge retainer lower, the annular RF, and a lower hinge that is fixed to a vehicle main body, are fastened together by a fastening member.

In the vehicle door structure of the sixth aspect, the first bracket and the second bracket are fastened to the front end portion of the impact beam. Further, the first bracket is welded to the annular RF. Moreover, the first bracket, the hinge retainer lower, the annular RF, and the lower hinge that is fixed to the vehicle main body, are fastened together by a fastening member. Further, the front end portion of the second bracket is joined to the annular RF. Therefore, load, that is inputted to the impact beam at the time of a collision, is transmitted to the vehicle main body via the lower hinge. As a result, load that is inputted to the door inner panel that is made of FRP is reduced.

In a vehicle door structure of a seventh aspect of the present disclosure, which includes the first aspect, the at least one reinforcing member includes: an impact beam that is provided further downward than a door vertical direction intermediate portion of the vehicle door; and the vehicle door structure further includes a third bracket that is fastened to a rear end portion of the impact beam; and a metal lock reinforcement that is provided at a door outer side of a door rear portion of the door inner panel, and to which a door lock device is mounted, wherein the third bracket, the annular RF, the lock RF and the door inner panel are fastened together by a fastening member.

In the vehicle door structure of the seventh aspect, the third bracket is fastened to the rear end portion of the impact beam. Further, the third bracket is fastened together with the annular RF, the lock RF and the door inner panel. Therefore, load, that is inputted to the impact beam at the time of a collision is transmitted to the vehicle main body via the door lock device. As a result, load that is inputted to the door inner panel that is made of FRP is reduced.

BRIEF DESCRIPTION OF THE DRAWINGS

Exemplary embodiments will be described in detail based on the following figures, wherein.

DETAILED DESCRIPTION

Figure 5:
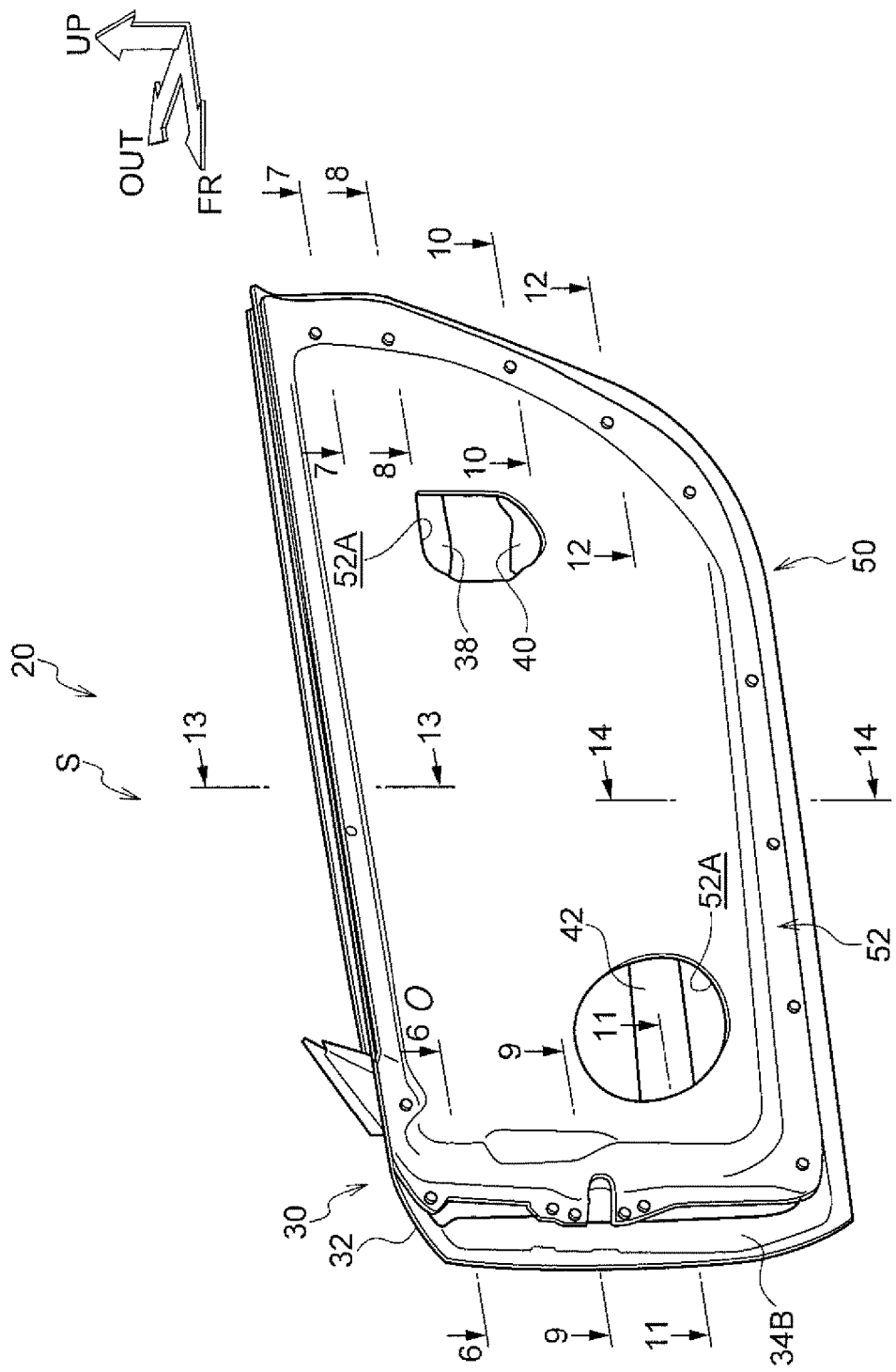
FIG. 5 is a drawing showing the side door to which the vehicle door structure of the present embodiment is applied, and is a perspective view seen from the door inner side.

A side door 20, that serves as a "vehicle door" to which a vehicle door structure S relating to an embodiment of the present disclosure is applied, is described hereinafter by using the drawings. The main portions of the side door 20, that is disposed at the right side portion of a vehicle (an automobile), are shown in FIG. 5 in a schematic perspective view. Note that arrow FR that is shown appropriately in the drawings indicates the door front side of the side door 20, arrow UP indicates the door upper side, and arrow OUT indicates the door outer side.

The side door 20 is, at the front end portion thereof, assembled to a vehicle main body so as to be able to open and close with the door vertical direction being the axial direction, by an upper hinge 64 and a lower hinge 68 that are described later. In the state in which the side door 20 is assembled to the vehicle main body and closes the door opening portion of the vehicle, the thickness direction of the side door 20 coincides with the vehicle transverse direction of the vehicle, and the door outer side coincides with the vehicle transverse direction outer side of the vehicle, and the door inner side coincides with the vehicle transverse direction inner side of the vehicle. Further, in this state, the door vertical direction coincides with the vehicle vertical direction, and the door longitudinal direction coincides with the vehicle longitudinal direction. Moreover, the side door 20 is structured to include a door outer assembly 30 that structures the door outer side portion of the side door 20, and a door inner assembly 50 that structures the door inner side portion of the side door 20. The structures of the door outer assembly 30 and the door inner assembly 50 are described hereinafter.

<Door Outer Assembly>

Figure 1:
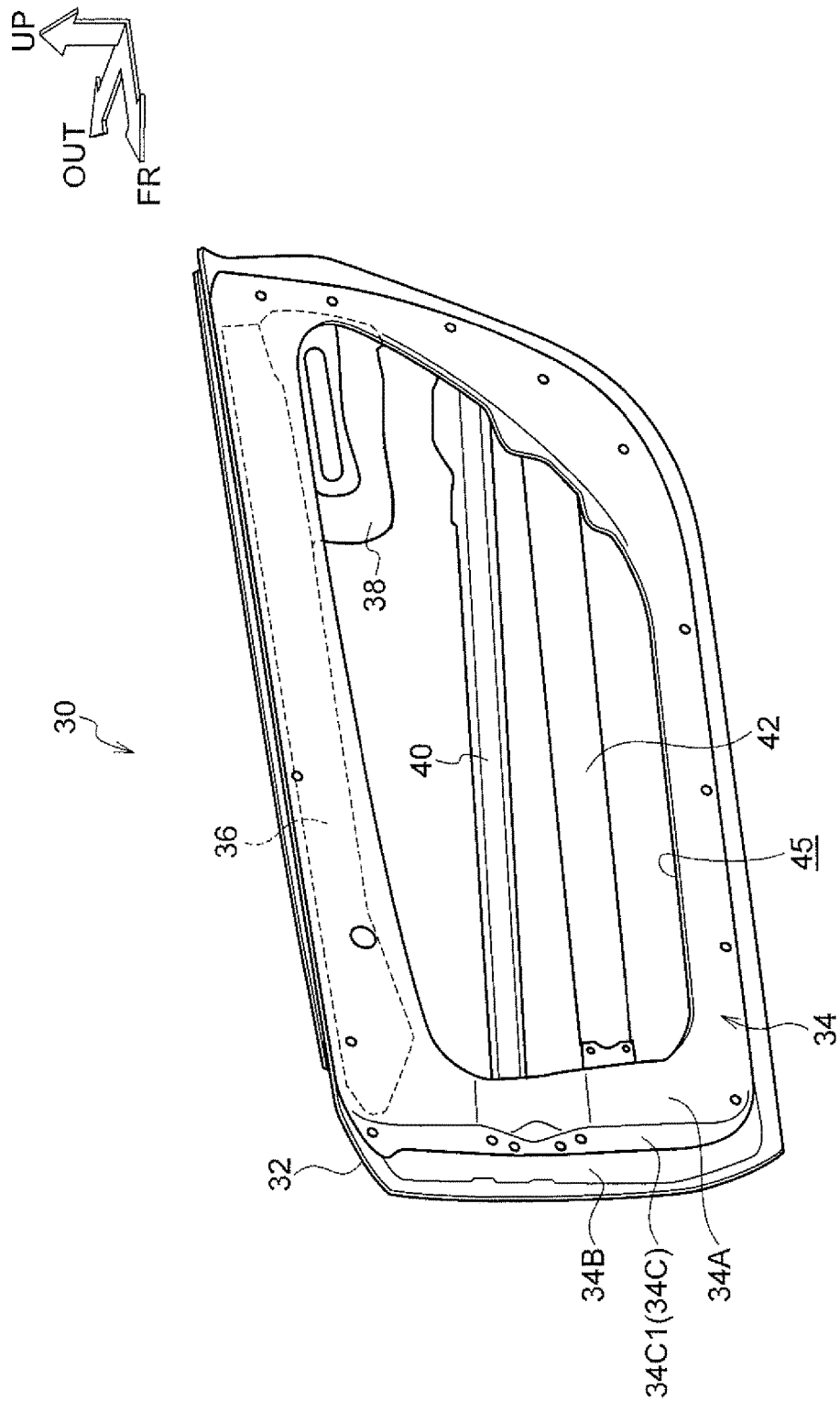
FIG. 1 is a drawing showing a door outer assembly that structures the door outer side portion of a side door to which a vehicle door structure of a present embodiment is applied, and is a perspective view seen from the door inner side.
Figure 2:
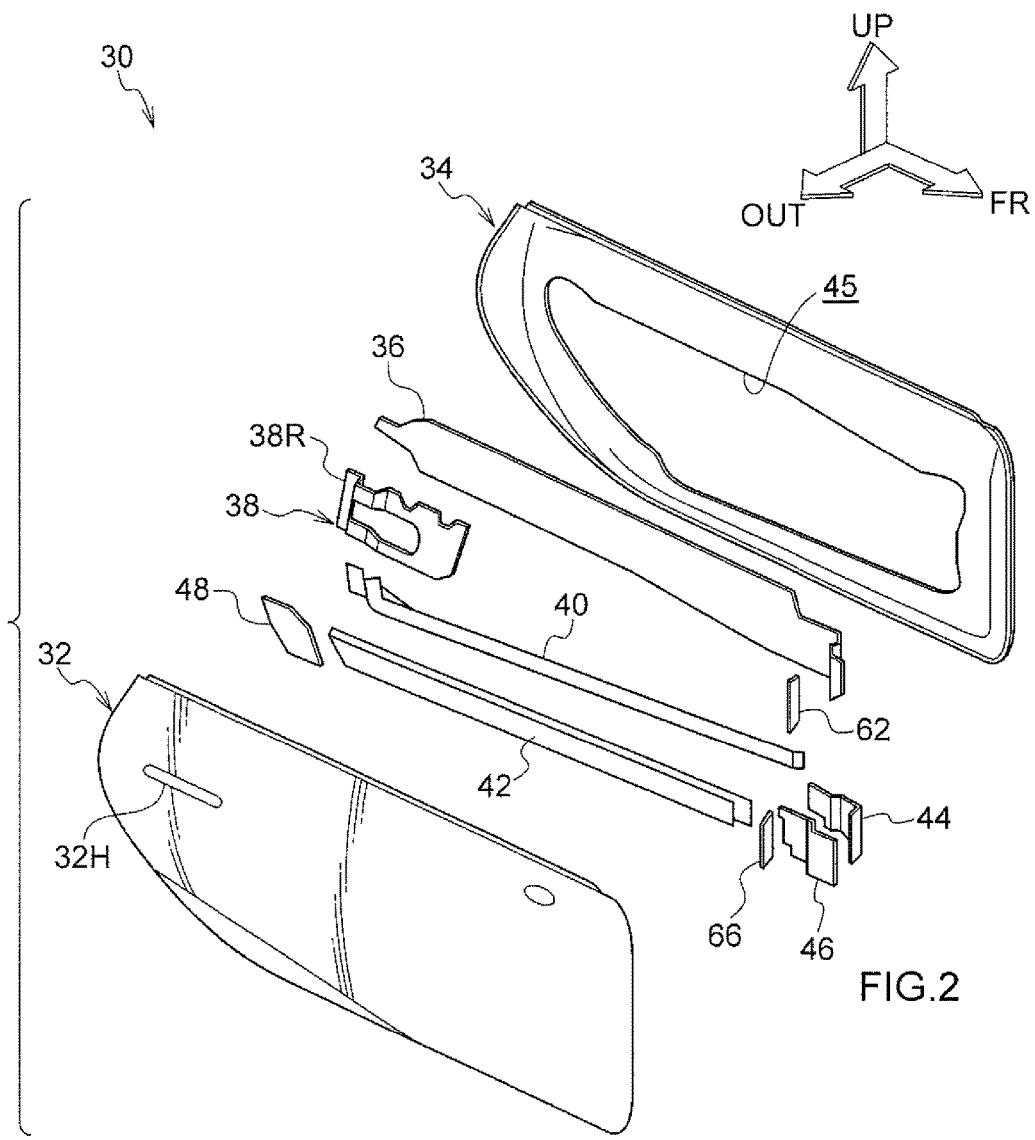
FIG. 2 is a drawing showing a state in which the door outer assembly shown in FIG. 1 is exploded, and is an exploded perspective view seen from the door outer side.

As shown in FIG. 1 and FIG. 2, the door outer assembly 30 is structured to include a door outer panel 32 that structures the design surface (outermost surface) of the side door 20, an annular reinforcement 34 (hereinafter called "annular RF 34"), a beltline outer reinforcement 36 (hereinafter called "beltline outer RF 36"), a handle reinforcement 38 (hereinafter called "handle RF 38"), a dent reinforcement 40 (hereinafter called "dent RF 40"), and an impact beam 42. The door outer panel 32, the annular RF 34, the beltline outer RF 36, the handle RF 38, the dent RF 40 and the impact beam 42 are structured from metal plate members (in the present embodiment, aluminum plate members). Namely, the door outer assembly 30 is structured by providing the annular RF 34 that is made of metal, and mounting the beltline outer RF 36, the handle RF 38, the dent RF 40, the impact beam 42, the door outer panel 32 and the like that are made of metal to this annular RF 34. Note that the above-described beltline outer RF 36, handle RF 38, dent RF 40 and impact beam 42, as well as a hinge retainer upper 62, a hinge retainer lower 66, a first bracket 44, a second bracket 46 and a third bracket 48 that are described later, respectively are parts that can be understood to be door outer assembly structural parts that are joined to the annular RF 34.

(Door Outer Panel)

The door outer panel 32 is disposed such that the plate thickness direction thereof substantially is the thickness direction of the side door 20, and is formed in a substantially rectangular plate shape. The door outer panel 32 is disposed at the portion that is furthest toward the door outer side of the door outer assembly 30, and structures the design surface of the side door 20.

(Annular RF)

The annular RF 34 is provided at the door inner side of the door outer panel 32. The annular RF 34 is disposed such that the plate thickness direction thereof substantially is the thickness direction of the side door 20, and is formed in a substantially rectangular annular shape to run along the outer peripheral portion of the door outer panel 32. Due to the above structure, an opening portion 45 that is substantially rectangular is formed in the substantially central portion of the annular RF 34. Further, the annular RF 34 is formed in a concave shape that opens toward the vehicle outer side and the door upper side. Concretely, the annular RF 34 is structured to include a bottom wall 34A in which the opening portion 45 is formed, a flange 34B that structures the outer peripheral portion of the annular RF 34 except for the upper end portion, and a side wall 34C that connects the bottom wall 34A and the flange 34B. The outer peripheral edge portion of the flange 34B is joined by hemming to the outer peripheral edge portion of the door outer panel 32. Further, the wall portion, that structures the front end portion of the side door 20, at the side wall 34C is front wall 34C1, and the front wall 34C1 is disposed such that the plate thickness direction thereof substantially is the door longitudinal direction.

(Beltline Outer RF)

The beltline outer RF 36 is provided at the door inner side of the upper end portion of the door outer panel 32, and at the door outer side of the upper end portion of the annular RF 34. The beltline outer RF 36 extends in the door longitudinal direction such that the plate thickness direction thereof is the thickness direction of the side door 20. Further, the beltline outer RF 36 is joined to the annular RF 34. Due to the above structure, the upper end portion of the side door 20 (the door outer assembly 30) is reinforced by the beltline outer RF 36.

(Handle RF)

The handle RF 38 is provided at the door inner side with respect to an outside handle portion 32H (see FIG. 2) of the door outer panel 32, and at the door outer side with respect to the annular RF 34. The handle RF 38 is a member that is formed in a substantially oval shape that is flat as seen in a side view, and is disposed such that the plate thickness direction thereof is the door thickness direction. The handle RF 38 is made integral with the beltline outer RF 36 by being joined to the beltline outer RF 36. An outside door handle that is not illustrated is fixed to the handle RF 38. Note that the handle RF 38 and the beltline outer RF 36 may be formed from a single plate member.

(Dent RF)

The dent RF 40 extends in the door longitudinal direction, is provided between the annular RF 34 and the door outer panel 32, and is arranged such that the plate thickness direction thereof substantially is the thickness direction of the side door 20. The dent RF 40 is disposed so as to span over a door vertical direction intermediate portion at the opening portion 45 of the annular RF 34, and bridges the front end portion and the rear end portion of the annular RF 34. Further, the front end portion and the rear end portion of the dent RF 40 are joined to the annular RF 34.

(Impact Beam)

Figure 14:
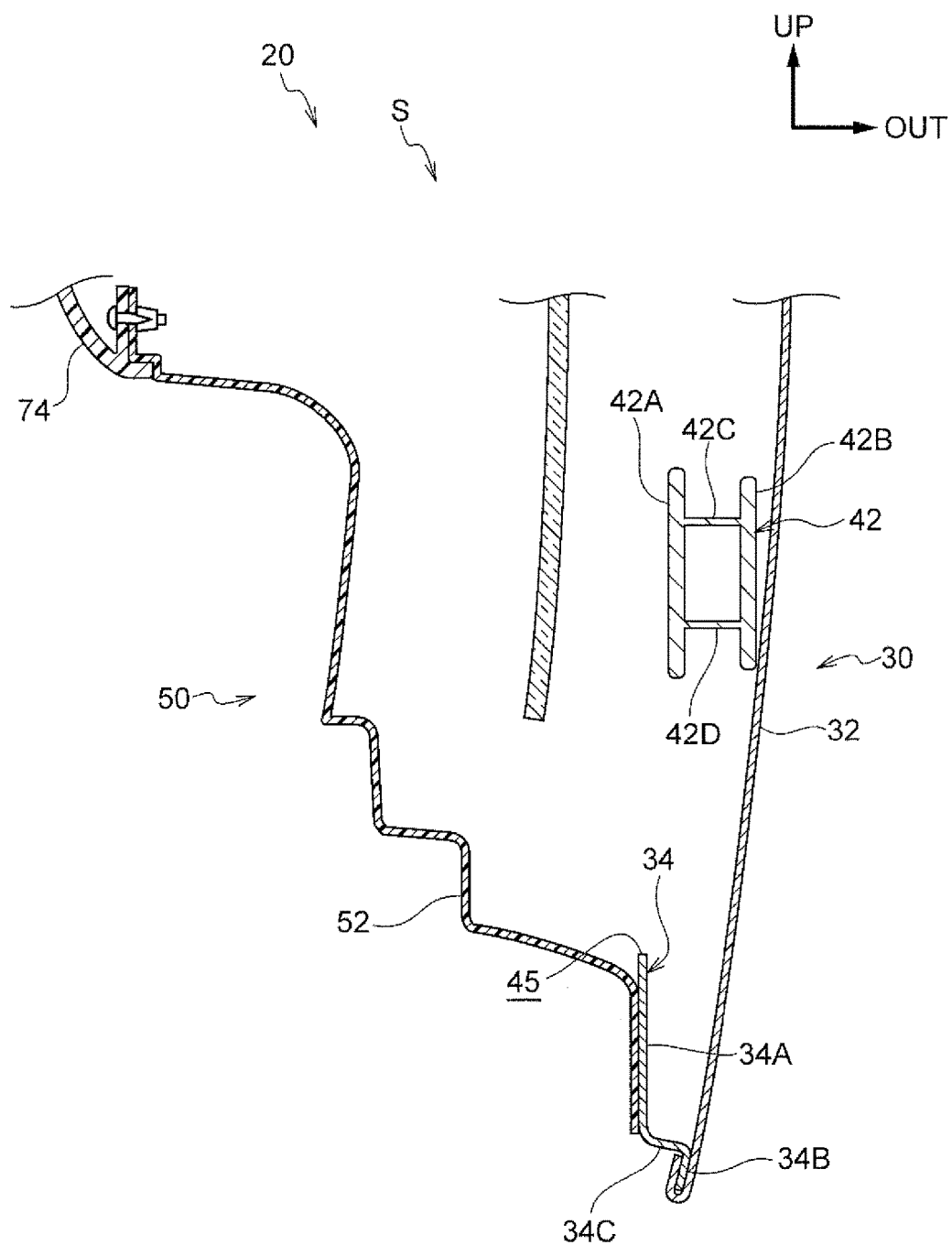
FIG. 14 is an enlarged sectional view (a cross-sectional view showing the state cut along line 14-14 of FIG. 5) that illustrates the structure of the lower portion of the side door of the present embodiment.

The impact beam 42 is made of metal (in the present embodiment, an aluminum metal). The impact beam 42 is disposed at the door lower side of the dent RF 40, and is formed substantially in the shape of a rectangular pillar that is hollow and that extends in the door longitudinal direction. Concretely, as shown in FIG. 14, the impact beam 42 is structured to include an inner wall 42A and an outer wall 42B that are disposed so as to face one another in the thickness direction of the side door 20, and an upper wall 42C and a lower wall 42D that are disposed so as to face one another in the door vertical direction. Further, the upper wall 42C is disposed at the door lower side with respect to the upper ends of the inner wall 42A and the outer wall 42B, and the lower wall 42D is disposed at the door upper side with respect to the lower ends of the inner wall 42A and the outer wall 42B. Namely, the upper end portions of the inner wall 42A and the outer wall 42B project-out further toward the door upper side than the upper wall 42C, and the lower end portions of the inner wall 42A and the outer wall 42B project-out further toward the door lower side than the lower wall 42D.

The front end portion of the impact beam 42 is connected to the front end portion of the annular RF 34 via the first bracket 44 and the second bracket 46. The rear end portion of the impact beam 42 is joined to the rear end portion of the annular RF 34 via the third bracket 48.

<Door Inner Assembly>

Figure 3:
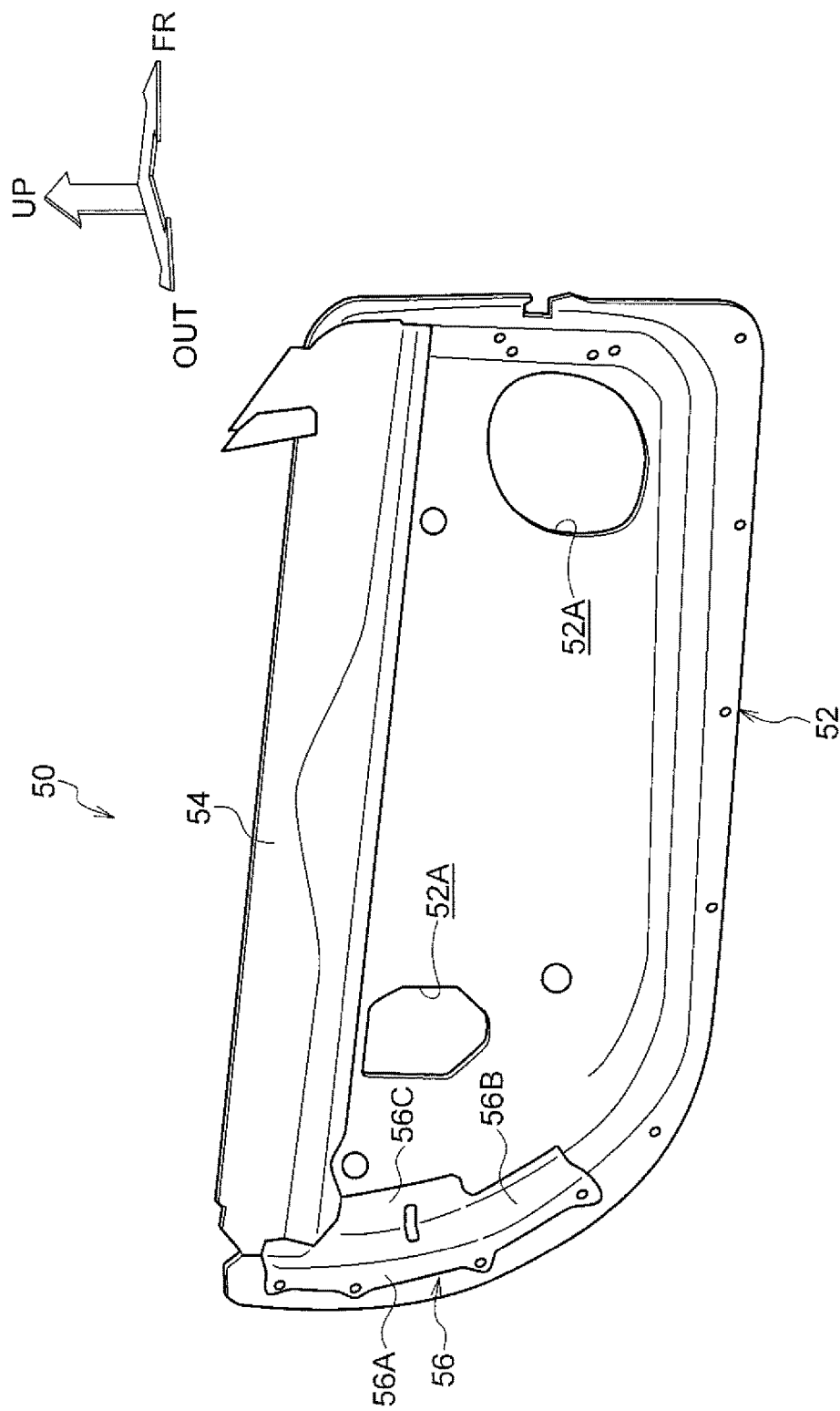
FIG. 3 is a drawing showing a door inner assembly that structures the door inner side portion of the side door to which the vehicle door structure of the present embodiment is applied, and is a perspective view seen from the door outer side.
Figure 4:
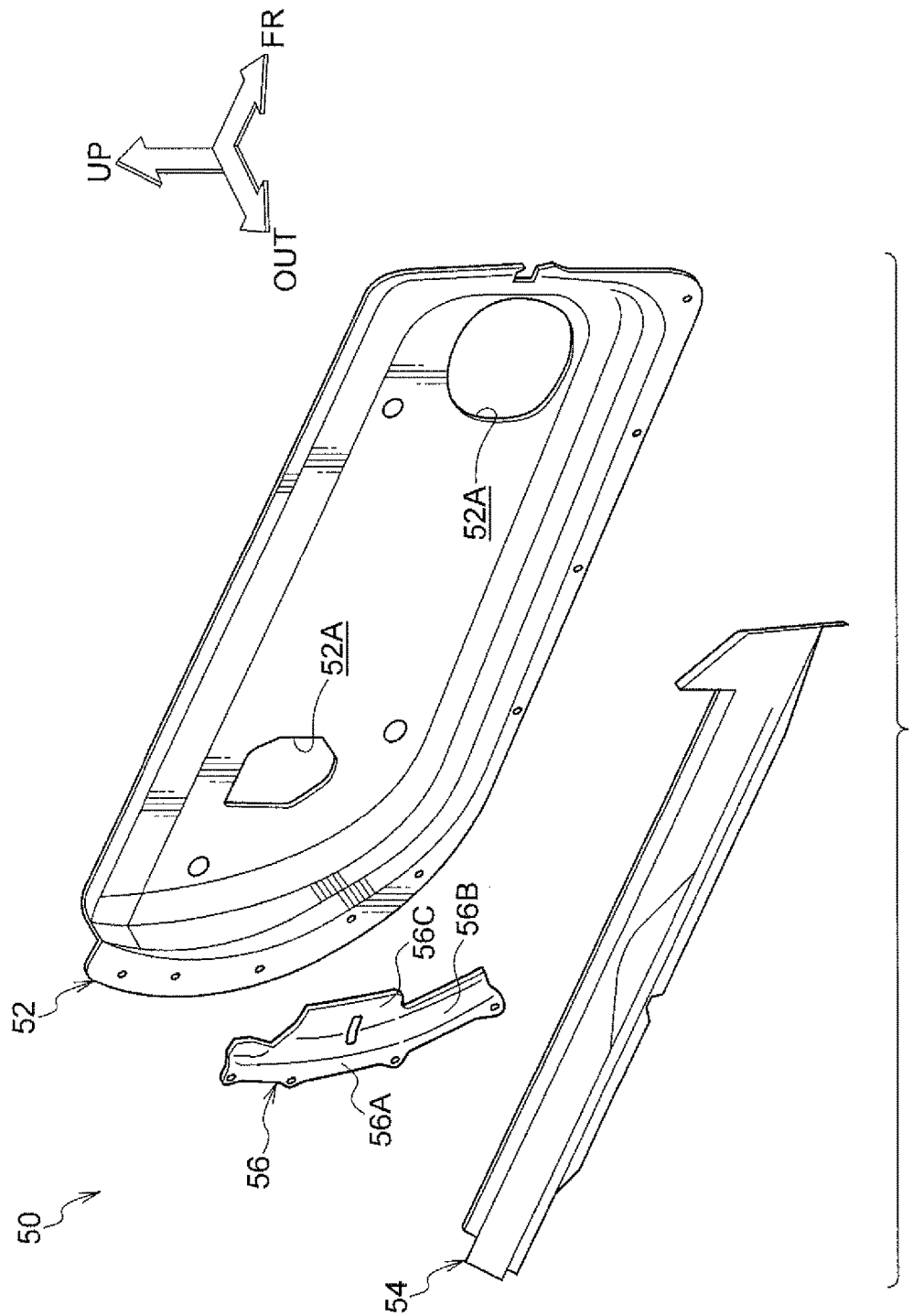
FIG. 4 is a drawing showing a state in which the door inner assembly shown in FIG. 3 is exploded, and is an exploded perspective view seen from the door outer side.

On the other hand, as shown in FIG. 3 and FIG. 4, the door inner assembly 50 is structured to include a door inner panel 52, a beltline inner reinforcement 54 (hereinafter called "beltline inner RF 54"), and a lock reinforcement 56 (hereinafter called "lock RF 56"). The door inner panel 52 and the beltline inner RF 54 are structured from fiber-reinforced resins (in the present embodiment, CFRPs (carbon-fiber-reinforced plastics)), and the lock RF 56 is structured from a plate member that is made of metal (in the present embodiment, an aluminum plate member). Namely, the door inner assembly 50 is structured due to the beltline inner RF 54, that is made of resin, and the lock RF 56, that is made of metal, and the like being mounted to the door inner panel 52 that is made of resin.

(Door Inner Panel)

As shown in FIG. 4 and FIG. 5, the door inner panel 52 is substantially rectangular plate shaped so as to cover the entire bottom wall 34A of the annular RF 34 from the door inner side, and the opening portion 45 of the annular RF 34 is covered by the door inner panel 52. Further, the door inner panel 52 is formed in a concave shape that opens toward the door outer side. The outer peripheral portion of the door inner panel 52, except for the upper end portion thereof, is fastened and fixed to the outer peripheral portion of the annular RF 34 by plural fastening members.

Note that, as shown in FIG. 3 through FIG. 5, a pair of service holes 52A, are formed in the door front side portion and the door rear side portion of the door inner panel 52, and wiring work and the like of the parts that are disposed between the door inner panel 52 and the door outer panel 32, and the like, is possible. Further, a door trim 74 (see FIG. 13 and FIG. 14) is provided at the door inner side of the door inner assembly 50.

(Beltline Inner RF)

As shown in FIG. 3, the beltline inner RF 54 is provided at the door outer side of the upper end portion of the door inner panel 52. The beltline inner RF 54 is manufactured from a fiber-reinforced resin material (in the present embodiment, a CFRP (carbon-fiber-reinforced plastic)). The beltline inner RF 54 is formed in the shape of a plate that extends in the door longitudinal direction, and is disposed such that the plate thickness direction thereof is the thickness direction of the side door 20. Further, the beltline inner RF 54 is joined to the upper end portion of the door inner panel 52. Due to the above structure, the upper end portion of the side door 20 (the door inner assembly 50) is reinforced by the beltline inner RF 54. Note that the beltline inner RF 54 may be formed of metal.

(Lock RF)

The lock RF 56 is a metal plate member (in the present embodiment, an aluminum plate member), and, as seen from the door upper side, is bent in a substantial crank shape to run along the door inner panel 52. Concretely, the lock RF 56 is structured to include a mounting wall 56A that is disposed such that the plate thickness direction thereof is the thickness direction of the side door 20, an intermediate wall 56B that extends-out from the front end of the mounting wall 56A toward the door inner side, and a front wall 56C that extends-out from the door inner side end of the intermediate wall 56B toward the door front side. The lock RF 56 is joined to the door inner panel 52 via an adhesive or the like. Further, insert-through holes through which bolts are inserted are formed in the mounting wall 56A.

Note that an unillustrated door lock device is mounted to the lock RF 56 from the door outer side. This is a structure in which the side door 20 is locked to the vehicle main body due to a latch (not illustrated) of the door lock device being engaged with a striker (not illustrated) that is fixed to the vehicle main body.

—Detailed Structure—

The detailed structure of the side door 20 is described next by using FIG. 6 through FIG. 14 that are cross-sectional views corresponding to the respective cutting lines illustrated in FIG. 5.

Figure 6:
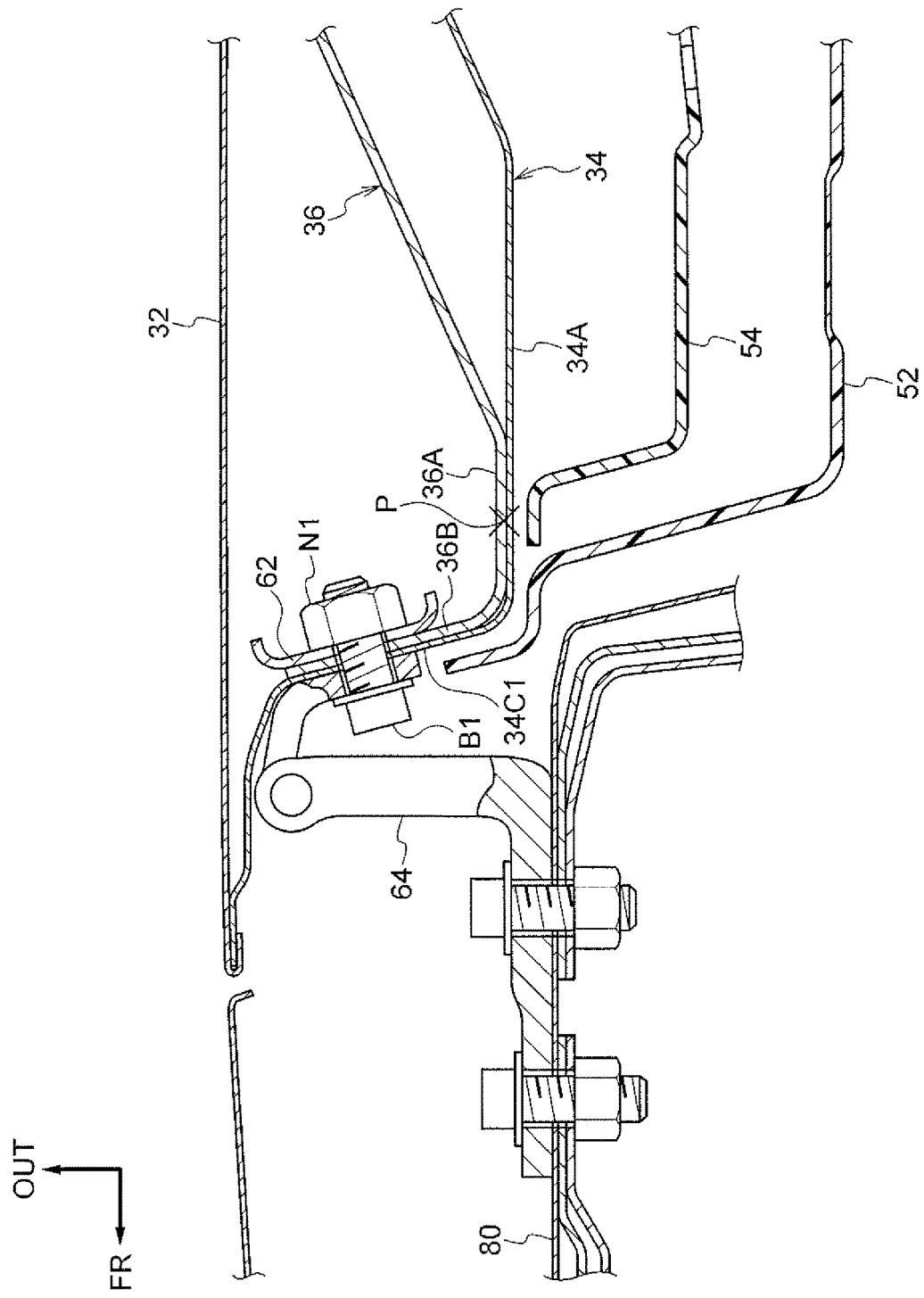
FIG. 6 is an enlarged sectional view (a cross-sectional view showing the state cut along line 6-6 of FIG. 5) that illustrates the structure at the periphery of the front end portion of a beltline outer RF of the present embodiment.

The structure of the periphery of the front end portion of the beltline outer RF 36 is shown in FIG. 6. As shown in this drawing, the front end portion of the beltline outer RF 36 extends to the front wall 34C1 of the annular RF 34. Further, the front end portion of the beltline outer RF 36 is bent toward the door outer side. Concretely, the beltline outer RF 36 is structured to include a welded wall portion 36A whose plate thickness direction is the door thickness direction, and a fastened wall portion 36B that extends from the front end of the welded wall portion 36A substantially toward the door outer side. The welded wall portion 36A of the beltline outer RF 36 is welded at welding point P to the bottom wall 34A of the annular RF 34 in a state of being superposed thereon from the door outer side.

The fastened wall portion 36B of the beltline outer RF 36 is superposed on the front wall 34C1 of the annular RF 34. Concretely, the rear surface of the front wall 34C1 of the annular RF 34 and the front surface of the fastened wall portion 36B of the beltline outer RF 36 contact one another. Further, the hinge retainer upper 62 that is structured from a plate member made of metal (in the present embodiment, an aluminum plate member) is provided at the door rear side of the fastened wall portion 36B of the beltline outer RF 36. The hinge retainer upper 62 is disposed with the plate thickness direction thereof substantially being the door longitudinal direction, and the front surface of the hinge retainer upper 62 is joined to the rear surface of the fastened wall portion 36B of the beltline outer RF 36. Further, a nut N1 for hinge fixing is fixed to the rear surface of the hinge retainer upper 62.

On the other hand, the upper hinge 64 that is fixed to a front pillar 80 (the vehicle main body) is provided at the door front side of the front wall 34C1 of the annular RF 34. Insert-through holes are formed so as to pass-through the upper hinge 64, the front wall 34C1 of the annular RF 34, the fastened wall portion 36B of the beltline outer RF 36 and the hinge retainer upper 62 respectively, at positions corresponding to the nut N1 for hinge fixing. Bolt B1 for hinge fixing is inserted-through the respective insert-through holes, and is screwed-together with the nut N1 for hinge fixing. Due to the above structure, the hinge retainer upper 62, the fastened wall portion 36B that is the front end portion of the beltline outer RF 36, the annular RF 34 and the upper hinge 64 are fastened together by fastening members that are for fixing the hinge. Further, due to the above structure, the annular RF 34 is connected to the vehicle main body via the upper hinge 64, and the door outer assembly 30 (the side door 20) is supported at the vehicle main body so as to be able to open and close.

Figure 7:
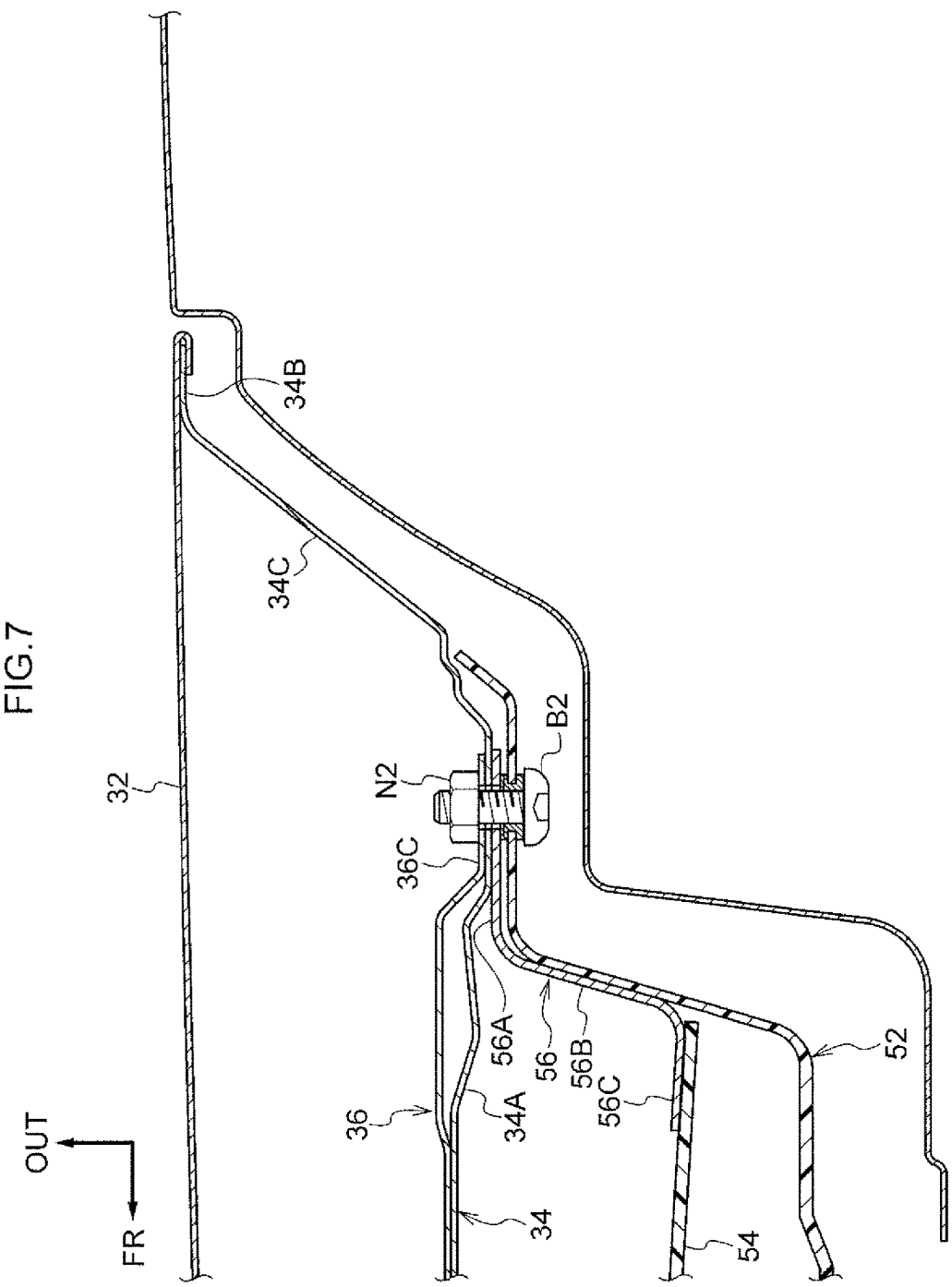
FIG. 7 is an enlarged sectional view (a cross-sectional view showing the state cut along line 7-7 of FIG. 5) that illustrates the structure at the periphery of the rear end portion of the beltline outer RF of the present embodiment.

The structure at the periphery of a rear end portion 36C of the beltline outer RF 36 is shown in FIG. 7. As shown in this drawing, the rear end portion 36C of the beltline outer RF 36 extends to a vicinity of the rear end portion of the bottom wall 34A of the annular RF 34, and is superposed on the bottom wall 34A of the annular RF 34 from the door outer side. Further, the mounting wall 56A of the lock RF 56 is disposed at the door inner side of the portion, where the rear end portion of the beltline outer RF 36 is superposed, of the bottom wall 34A of the annular RF 34. The door inner panel 52 is disposed further toward the door inner side. Insert-through holes are formed so as to pass-through the beltline outer RF 36, the annular RF 34, the lock RF 56 and the door inner panel 52 respectively, at positions corresponding to a nut N2 for fixing. A bolt B2 for fixing is inserted-through the respective insert-through holes and is screwed-together with the nut N2 for fixing. Due to the above structure, the rear end portion 36C of the beltline outer RF 36, the annular RF 34, the lock RF 56 and the door inner panel 52 are fastened together by the bolt (the bolt B2 for fixing) that is for fastening the door inner assembly 50 and the door outer assembly 30.

Figure 13:
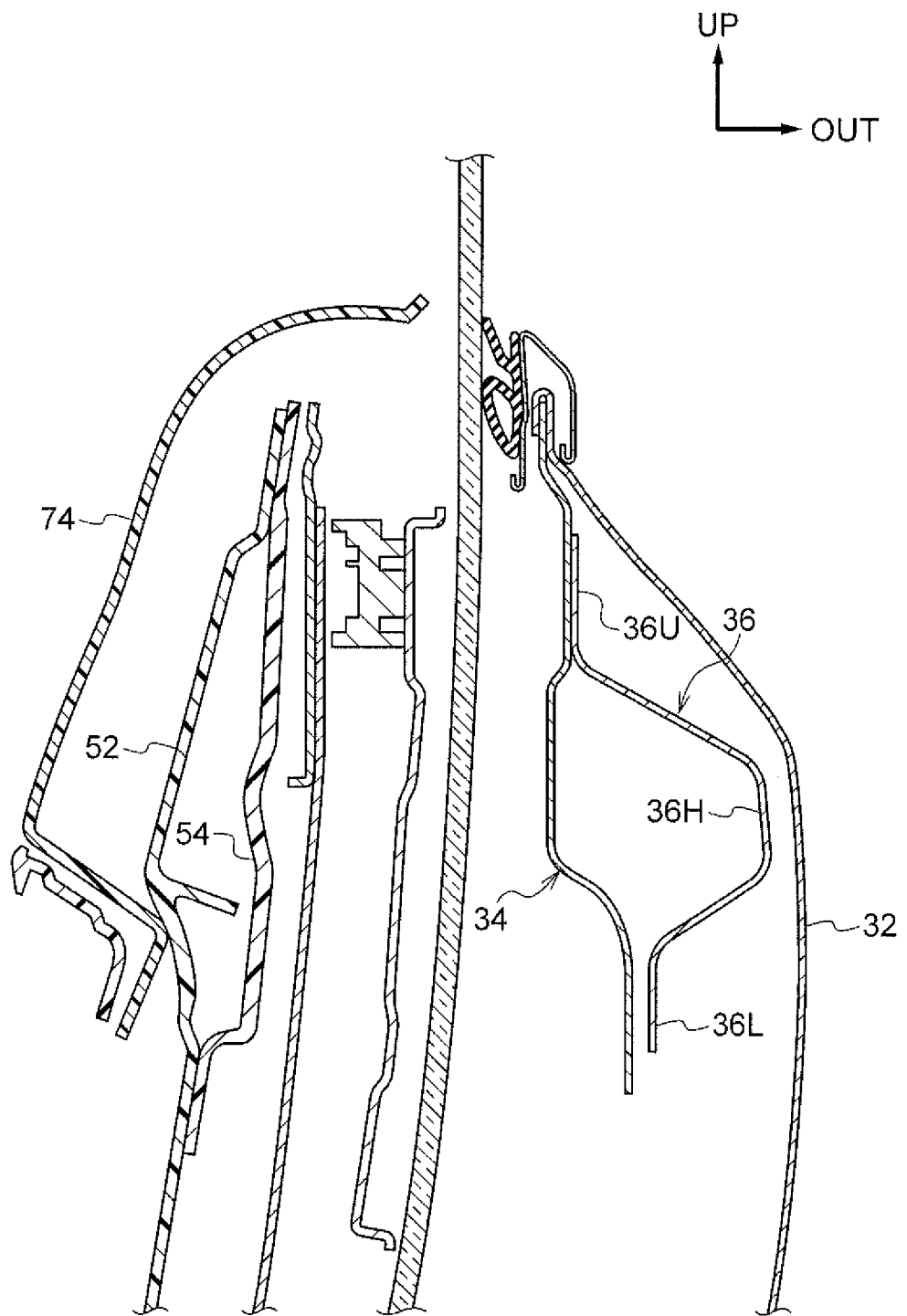
FIG. 13 is an enlarged sectional view (a cross-sectional view showing the state cut along line 13-13 of FIG. 5) that illustrates the structure of the upper portion of the side door of the present embodiment.

The structure of the upper portion of the side door 20 is shown in FIG. 13. As shown in this drawing, the beltline outer RF 36 is formed in the shape of a hat that opens toward the door inner side. Concretely, the beltline outer RF 36 is structured to include an upper flange portion 36U and a lower flange portion 36L that are joined by welding to the annular RF 34, and a main body portion 36H that connects the lower end of the upper flange portion 36U and the upper end of the lower flange portion 36L and is bent so as to be convex toward the door outer side. Further, the upper portion of the annular RF 34 is formed in the shape of a hat in the opposite direction as the beltline outer RF. Due to the above structure, a structure whose cross-section is a closed cross-section is formed along the door beltline by the annular RF 34 and the beltline outer RF 36. Note that the upper flange portion 36U and the lower flange portion 36L are spot welded at predetermined intervals along the door longitudinal direction, and, at the portions that are not spot welded (the portions between adjacent spot welded portions), the beltline outer RF 36 and the annular RF 34 are slightly separated from one another. Therefore, in the cross-section shown in FIG. 13, the lower flange portion 36L and the annular RF 34 are illustrated as being apart from one another.

Figure 8:
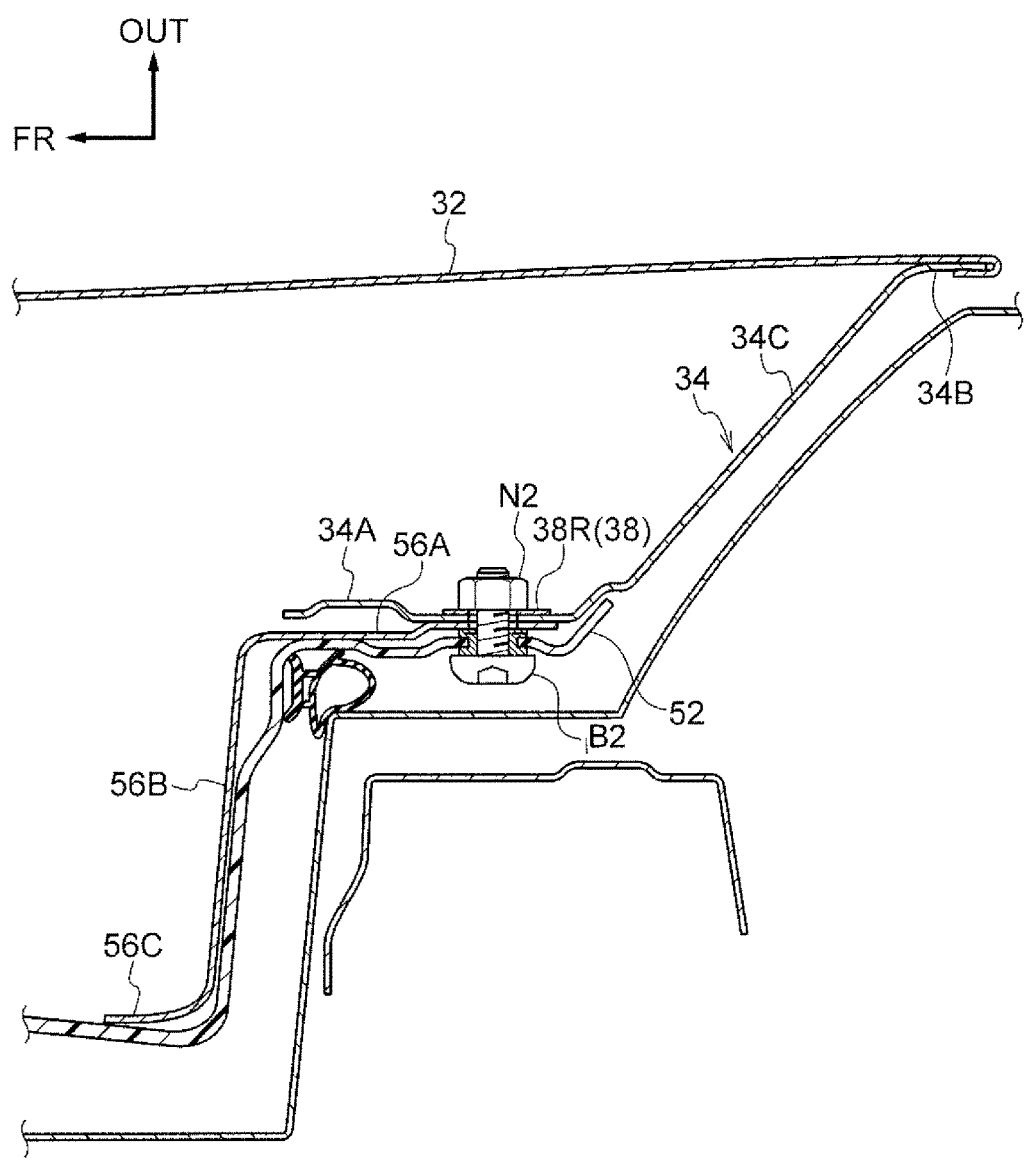
FIG. 8 is an enlarged sectional view (a cross-sectional view showing the state cut along line 8-8 of FIG. 5) that illustrates the structure at the periphery of an outside handle of the side door of the present embodiment.

The structure of the periphery of the outside handle of the side door 20 is shown in FIG. 8. As shown in this drawing, a rear end portion 38R of the handle RF 38 is disposed at the door outer side of the bottom wall 34A of the annular RF 34. Further, the mounting wall 56A of the lock RF 56 is disposed at the door inner side of the bottom wall 34A of the annular RF 34. Namely, the handle RF 38 is joined to the beltline outer RF 36, and the rear end portion 38R of the handle RF 38 extends to the position where the mounting wall 56A of the lock RF 56 is disposed at the annular RF 34. Further, the door inner panel 52 is disposed at the door inner side of the mounting wall 56A of the lock RF 56. Further, the nut N2 is fixed to the door outer side of the rear end portion 38R of the handle RF 38. Insert-through holes are formed so as to pass-through the rear end portion 38R of the handle RF 38, the bottom wall 34A of the annular RF 34, the mounting wall 56A of the lock RF 56 and the door inner panel 52, at positions corresponding to the nut N2 for fixing. The bolt B2 for fixing is inserted-through the respective insert-through holes, and is screwed-together with the nut N2 for fixing. Due to the above structure, the handle RF 38, the annular RF 34, the lock RF 56 and the door inner panel 52 are fastened together by the bolt (the bolt B2 for fixing) that is for fixing the door inner assembly 50 and the door outer assembly 30.

Figure 9:
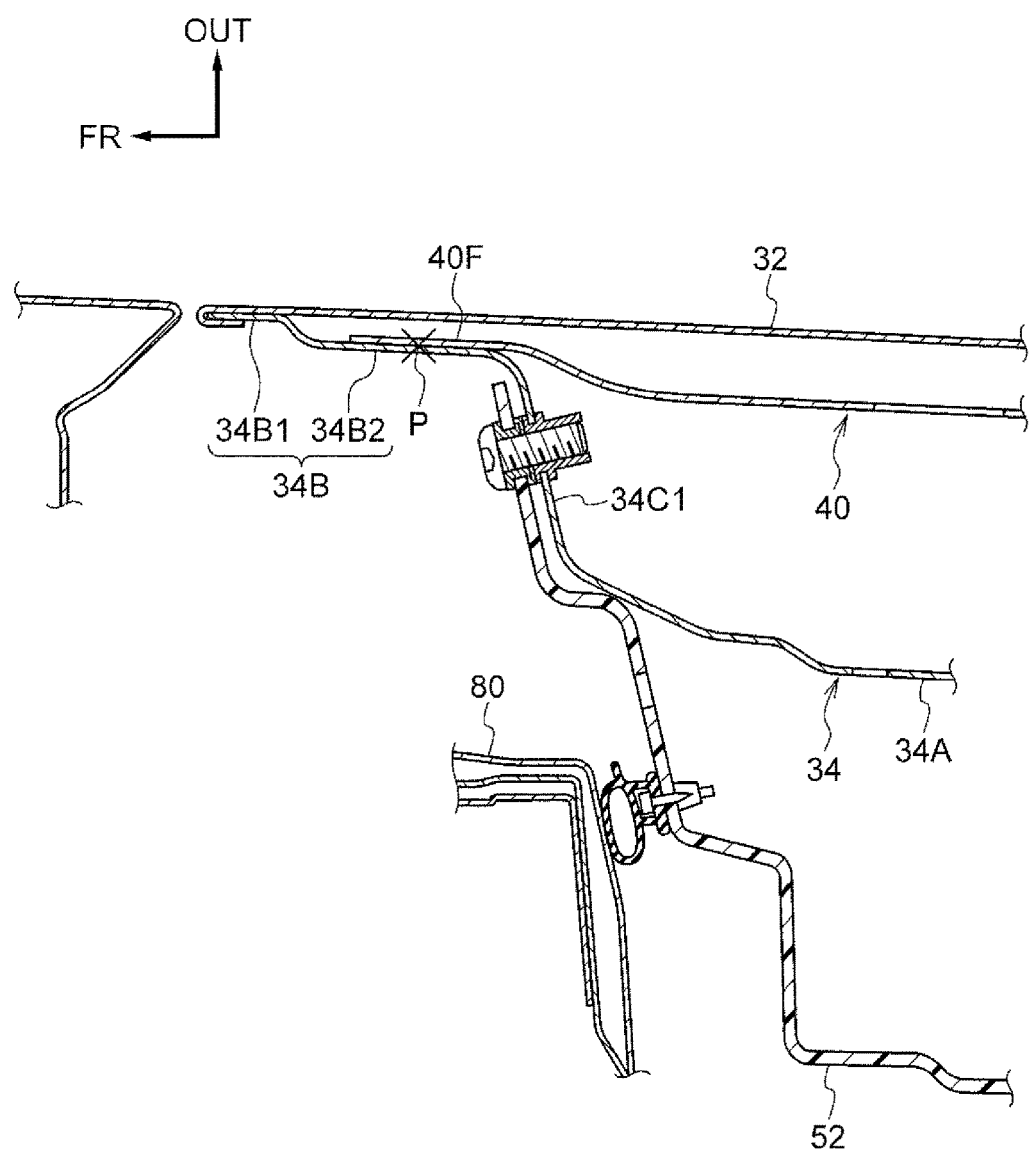
FIG. 9 is an enlarged sectional view (a cross-sectional view showing the state cut along line 9-9 of FIG. 5) that illustrates the structure at the periphery of the front end portion of a dent RF of the present embodiment.
Figure 10:
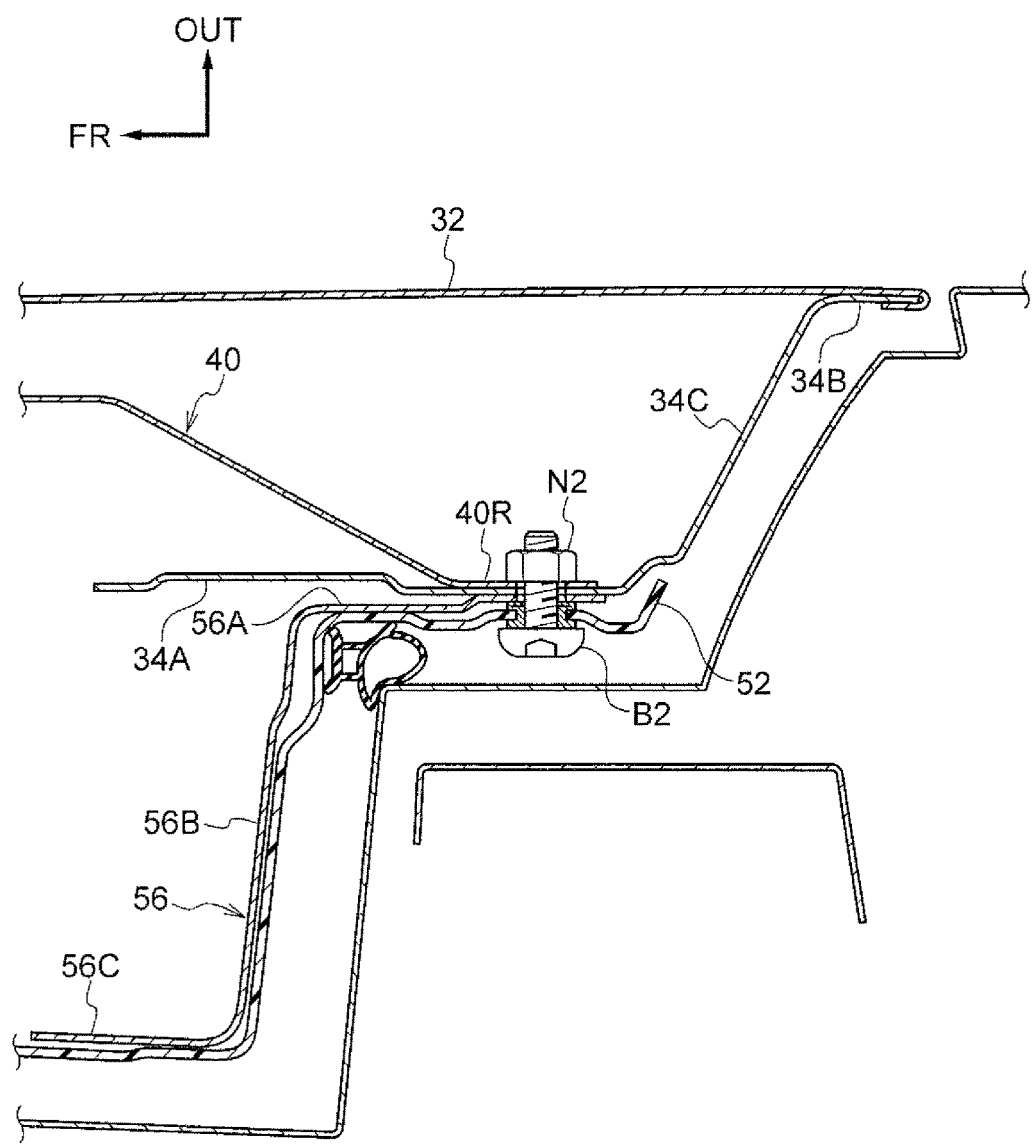
FIG. 10 is an enlarged sectional view (a cross-sectional view showing the state cut along line 10-10 of FIG. 5) that illustrates the structure at the periphery of the rear end portion of the dent RF of the present embodiment.

The structure at the periphery of a front end portion 40F of the dent RF 40 is shown in FIG. 9, and the structure at the periphery of a rear end portion 40R of the dent RF 40 is shown in FIG. 10. As shown in FIG. 9, the flange 34B of the annular RF 34 is structured to include a flange front portion 34B1 that is joined by hemming at the front end portion of the door outer panel 32, and a flange rear portion 34B2 that is apart from the door outer panel 32 and is substantially parallel to the door outer panel 32. Further, the front end portion 40F of the dent RF 40 is welded at welding point P to the flange rear portion 34B2 of the annular RF 34 in a state of being superposed thereon from the door outer side.

Further, as shown in FIG. 10, the dent RF 40 is inclined toward the door inner side at the rear portion thereof. The rear end portion 40R of the dent RF 40 contacts the door outer side surface of the bottom wall 34A of the annular RF 34. The mounting wall 56A of the lock RF 56 is disposed at the door inner side of the portion, that contacts the rear end portion 40R of the dent RF 40, of the bottom wall 34A of the annular RF 34. Moreover, the door inner panel 52 is disposed at the door inner side of the mounting wall 56A of the lock RF 56. The nut N2 for fixing is fixed to the door outer side surface of the rear end portion 40R of the dent RF 40. Insert-through holes are formed so as to pass-through the rear end portion 40R of the dent RF 40, the bottom wall 34A of the annular RF 34, the mounting wall 56A of the lock RF 56 and the door inner panel 52, at positions corresponding to the nut N2 for fixing. The bolt B2 for fixing is inserted-through the respective insert-through holes and is screwed-together with the nut N2 for fixing. Due to the above structure, the rear end portion 40R of the dent RF 40, the annular RF 34, the lock RF 56 and the door inner panel 52 are fastened together by the bolt (the bolt B2 for fixing) that is for fastening the door inner assembly 50 and the door outer assembly 30.

Figure 11:
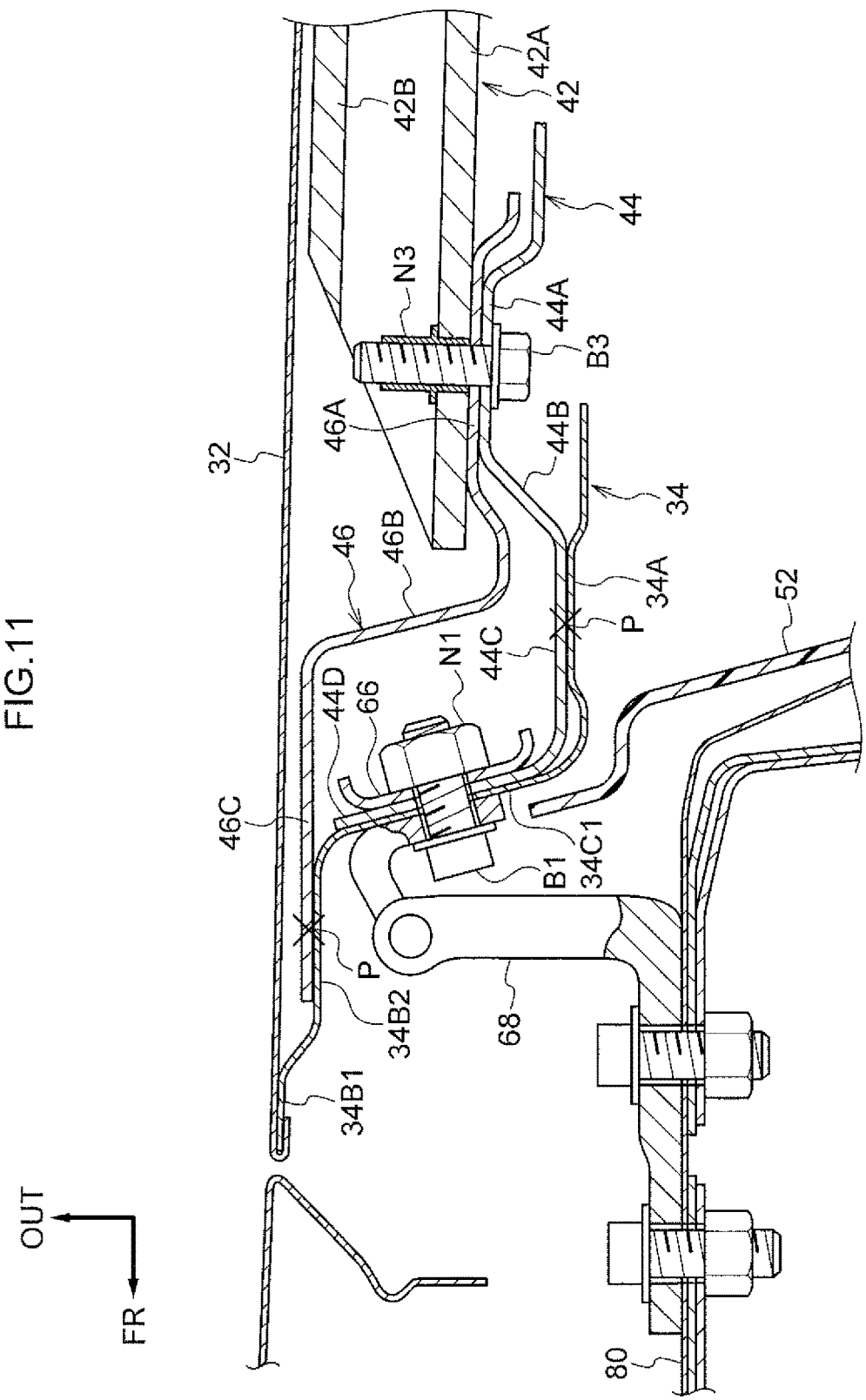
FIG. 11 is an enlarged sectional view (a cross-sectional view showing the state cut along line 11-11 of FIG. 5) that illustrates the structure at the periphery of the front end portion of an impact beam of the present embodiment.

The structure of the periphery of the front end portion of the impact beam 42 is shown in FIG. 11. As shown in this drawing, the first bracket 44 and the second bracket 46 are fastened and fixed to the inner wall 42A at the front end portion of the impact beam 42. Concretely, the second bracket 46 is disposed at the door inner side of the inner wall 42A of the impact beam 42, and the first bracket 44 is disposed farther toward the door inner side than the second bracket 46. Further, a nut N3 is fixed by caulking to the inner wall 42A at the front end portion of the impact beam 42. Due to a bolt B3 being screwed-together with the nut N3, the second bracket 46 and the first bracket 44 are fastened and fixed to the inner wall 42A.

The first bracket 44 is structured to include a rear side joining portion 44A whose plate thickness direction is the door thickness direction, an extra length portion 44B that is inclined from the front end of the rear side joining portion 44A toward the door inner side, a front side welded portion 44C that extends from the front end of the extra length portion 44B toward the door front side, and a hinge side fastened portion 44D that is inclined from the front end of the front side welded portion 44C toward the door outer side. The front side welded portion 44C and the bottom wall 34A of the annular RF 34 are welded at the welding point P.

Further, the hinge retainer lower 66, that is structured from a plate member made of metal (in the present embodiment, an aluminum plate member), is provided at the door rear side of the hinge side fastened portion 44D. The hinge retainer lower 66 is disposed such that the plate thickness direction thereof substantially is the door longitudinal direction, and the front surface of the hinge retainer lower 66 is joined to the rear surface of the hinge side fastened portion 44D of the first bracket 44. Further, the nut Ni for hinge fixing is fixed to the rear surface of the hinge retainer lower 66.

On the other hand, the lower hinge 68 that is fixed to the front pillar 80 (the vehicle main body) is provided at the door front side of the front wall 34C1 of the annular RF 34, Insert-through holes are formed so as to pass-through the hinge retainer lower 66, the lower hinge 68, the front wall 34C1 of the annular RF 34 and the hinge side fastened portion 44D of the first bracket 44 respectively, at positions corresponding to the nut N1 for hinge fixing. The bolt B1 for hinge fixing is inserted-through the respective insert-through holes, and is screwed-together with the nut N1 for hinge fixing. Due to the above structure, the first bracket 44, the hinge retainer lower 66, the annular RF 34, and the lower hinge 68 that is Fixed to the vehicle main body are fastened together by the fastening members (the bolt B1 for hinge fixing and the nut N1 for hinge fixing) that are for fixing the hinge. Further, due to the above structure, the annular RF 34 is connected to the vehicle main body via the lower hinge 68, and the door outer assembly 30 (the side door 20) is supported at the vehicle main body so as to be able to open and close.

The second bracket 46 is formed from a plate member made of metal (in the present embodiment, an aluminum plate member), and is bent substantially in the shape of a crank as seen from the door upper side. Concretely, the second bracket 46 is bent in the shape of a crank such that the front end portion of the second bracket 46 is disposed further toward the door outer side than the rear end portion thereof. Due to the above structure, the second bracket 46 is structured to include a rear side joined portion 46A whose plate thickness direction is the door thickness direction, an extra length portion 46B that is inclined from the front end of the rear side joined portion 46A toward the door inner side and thereafter is further inclined toward the door outer side, and a front side welded portion 46C that extends from the front end of the extra length portion 46B toward the door front side. Further, the front side welded portion 46C that is the front end portion of the second bracket 46 is disposed between the flange 34B (the flange rear portion 34B2) of the annular RF 34 and the door outer panel 32, and is welded at the welding point P to the flange rear portion 34B2 of the annular RF 34 in a state of being superposed thereon from the door outer side.

Figure 12:
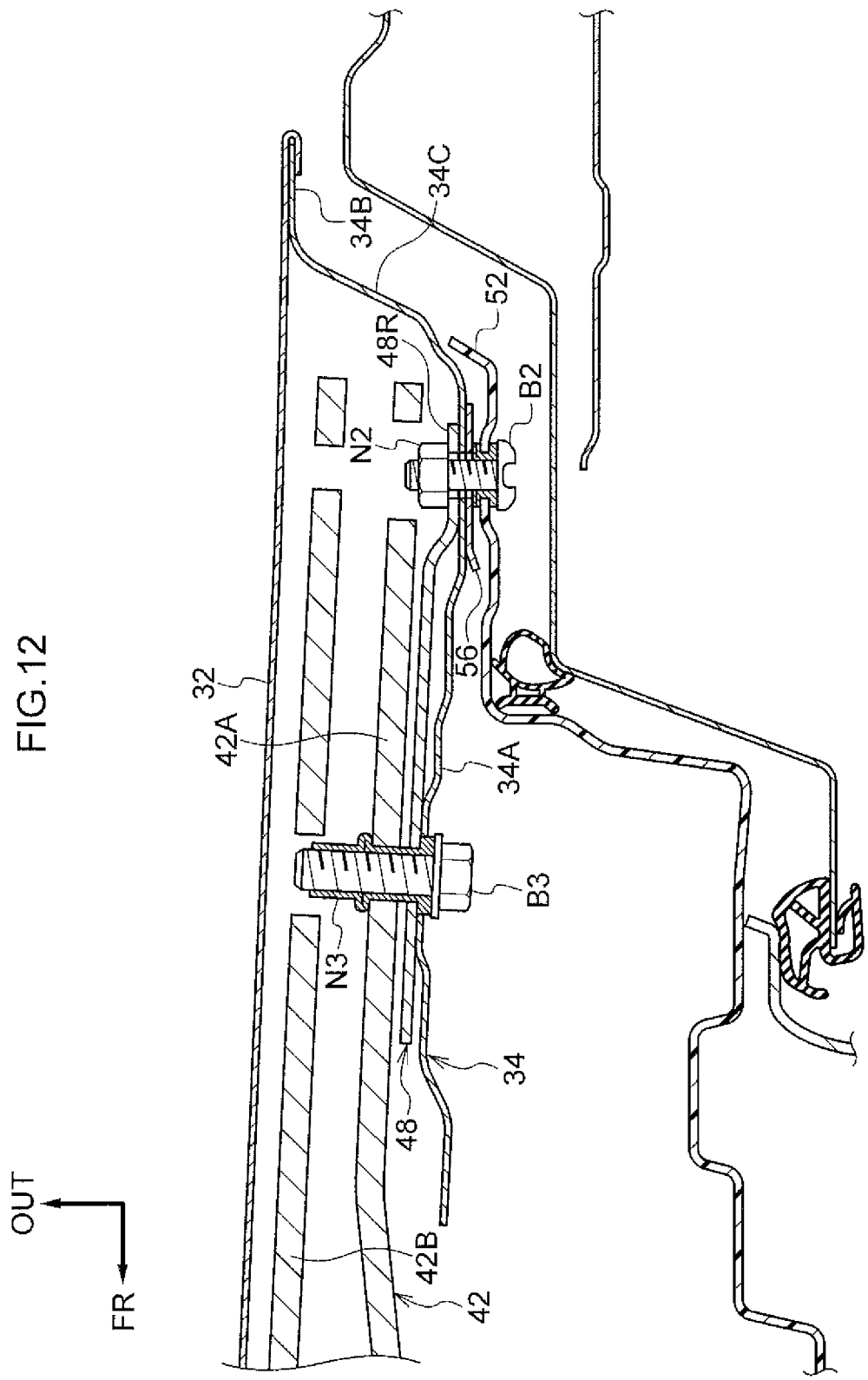
FIG. 12 is an enlarged sectional view (a cross-sectional view showing the state cut along line 12-12 of FIG. 5) that illustrates the structure at the periphery of the rear end portion of the impact beam of the present embodiment.

The structure of the periphery of the rear end portion of the impact beam 42 is shown in FIG. 12. As shown in this drawing, the inner wall 42A at the rear end portion of the impact beam 42 is connected via the third bracket 48 to the bottom wall 34A at the rear end portion of the annular RF 34. This third bracket 48 is formed from a metal plate member (in the present embodiment, an aluminum plate member), and is joined to the door outer side of the bottom wall 34A of the annular RF 34 with the plate thickness direction thereof substantially being the door thickness direction. Further, the nut N3 is fixed by caulking to the inner wall 42A at the rear end portion of the impact beam 42. Due to the bolt B3 being screwed-together with the nut N3, the inner wall 42A is fastened and fixed to the rear end portion of the annular RF 34 via the third bracket 48.

Further, a rear end portion 48R of the third bracket 48 extends to the portion, that is superposed with the lock RF 56, of the annular RF 34. The nut N2 is fixed to the door outer side surface of the rear end portion 48R of the third bracket 48. Insert-through holes are formed so as to pass-through the rear end portion 48R of the third bracket 48, the annular RF 34 and the door inner panel 52 respectively, at positions corresponding to the nut N2. The bolt B2 is inserted-through the respective insert-through holes and is screwed-together with the nut N2. Due to the above structure, the third bracket 48, the annular RF 34, the lock RF 56 and the door inner panel 52 are fastened together by the bolt (the bolt B2 for fixing) that is for fastening the door inner assembly 50 and the door outer assembly 30, <Operation/Effects>

Operation and effects of the vehicle door structure of the present embodiment are described next.

At the vehicle door structure S of the present embodiment, as shown in FIG. 1, FIG. 2 and FIG. 5, the annular RF 34 that is made of metal is provided at the door inner side of the door outer panel 32 that is made of metal and that structures the design surface of the side door 20. The annular RF 34 is formed in an annular shape to run along the outer peripheral portion of the door outer panel 32, and is joined to the outer peripheral portion of the door outer panel 32. Further, the door inner panel 52 that is made of a fiber-reinforced resin is provided at the door inner side of the annular RF 34, and is fastened and fixed to the annular RF 34.

Further, reinforcing members (the beltline outer RF 36, the dent RF 40, the impact beam 42) that extend in the door longitudinal direction are joined to the annular RF 34. Therefore, in a case in which load is inputted to the reinforcing members that extend in the door longitudinal direction at, for example, the time of a vehicle collision, the load can be received at the annular RF that is structured from metal that is ductile. As a result, the load that is inputted to the door inner panel 52 that is made of a fiber-reinforced resin is lessened, and the occurrence of breakage at the door inner panel 52 is suppressed.

Further, at the vehicle door structure S of the present embodiment, as shown in FIG. 6, the fastened wall portion 36B that is the front end portion of the beltline outer RF 36, the hinge retainer upper 62, the annular RF 34, and the upper hinge 64 that is fixed to the vehicle main body are fastened together by fastening members (the bolt B1 for hinge fixing and the nut N1 for hinge fixing). Therefore, the load, that is inputted to the beltline outer RF 36 at the time of a collision, is transmitted to the vehicle main body (the front pillar 80) via the upper hinge 64.

Further, at the vehicle door structure S of the present embodiment, as shown in FIG. 7, the rear end portion 36C of the beltline outer RF 36, the annular RF 34, the lock RF 56 and the door inner panel 52 are fastened together by fastening members (the bolt B2 and the nut N2). Therefore, the load, that is inputted to the beltline outer RF 36 at the time of a collision, is transmitted to the vehicle main body via the door lock device.

Further, at the vehicle door structure S of the present embodiment, as shown in FIG. 1, the beltline outer RF 36 and the handle RF 38 are made integral by being joined together. Moreover, as shown in FIG. 8, the rear end portion 38R of the handle RF 38, the annular RF 34, the lock RF 56 and the door inner panel 52 are fastened together by fastening members (the bolt B2 and the nut N2). Therefore, the load, that is inputted to the beltline outer RF 36 at the time of a collision, is transmitted to the vehicle main body via the door lock device.

Further, at the vehicle door structure S of the present embodiment, as shown in FIG. 9 and FIG. 10, the front end portion 40F of the dent RF 40 is joined to the annular RF 34, and the rear end portion 40R of the dent RF 40 is joined together with the annular RF 34, the lock RF 56 and the door inner panel 52 by fastening members (the bolt B2 and the nut N2). Therefore, the load, that is inputted to the dent RF 40 at the time of a collision, is transmitted to the vehicle main body via the hinge and the door lock device.

Further, at the vehicle door structure S of the present embodiment, as shown in FIG. 11, the first bracket 44 and the second bracket 46 are fastened and fixed to the front end portion of the impact beam 42. The first bracket 44 is welded to the annular RF 34, and further, the first bracket 44, the hinge retainer lower 66, the annular RF 34, and the lower hinge 68 that is fixed to the vehicle main body are fastened together by fastening members. Further, the front end portion of the second bracket 46 is joined to the annular RF 34. Therefore, the load, that is inputted to the impact beam 42 at the time of a collision, is transmitted to the vehicle main body via the lower hinge 68.

Further, at the vehicle door structure S of the present embodiment, extra length with respect to the door longitudinal direction is provided at the first bracket 44 and the second bracket 46 that connect the front end portion of the impact beam 42 and the annular RF 34. Therefore, in a case in which collision load is inputted to the impact beam 42, collision energy is absorbed due to the first bracket 44 and the second bracket 46 deforming so as to extend in the vehicle longitudinal direction.

Further, at the vehicle side door structure of the present embodiment, as shown in FIG. 12, the third bracket 48 is fastened to the rear end portion of the impact beam 42. Further, the third bracket 48 is fastened together with the annular RF 34, the lock RF 56 and the door inner panel 52. Therefore, the load, that is inputted to the impact beam 42 at the time of a collision, is transmitted to the vehicle main body via the door lock device.

<Assembly Processes and Other Effects>

Operation and effects other than the above-described operation and effects are described next in the course of describing the processes of assembling the side door 20.

At the time of assembling the side door 20, that is structured as described above, to a vehicle main body, first, the door outer assembly 30 and the door inner assembly 50 of the side door 20 are respectively set in states of being made into assemblies. Note that, in the state in which the door outer assembly 30 has been made into an assembly, the annular RF 34 is provided at the door inner side of the door outer panel 32, and the outer peripheral portion of the flange 34B of the annular RF 34 is joined to the outer peripheral portion of the door outer panel 32. Further, the door outer panel 32 and the annular RF 34 are respectively formed by metal members of aluminum.

Then, the upper hinge 64 and the lower hinge 68 are mounted to the front end portion of the annular RF 34 at the door outer assembly 30, and the door outer assembly 30 is connected to the vehicle main body. Concretely, the bolts Bi for hinge mounting are screwed-together with the nuts N1 for hinge mounting that are fixed to the hinge retainer upper 62 and the hinge retainer lower 66, and the door outer assembly 30 is assembled to the vehicle main body so as to be able to open and closed. In this state in which the door outer assembly 30 is assembled to the vehicle main body so as to be able to open and close, the door outer assembly 30 (the side door 20) is painted on-line.

By the way, in the painting on an assembly line of the door outer assembly 30 (the side door 20), the door outer assembly 30 is exposed to high temperatures (e.g., 180° C.). Therefore, when the linear expansion coefficient of the annular RF 34 and the linear expansion coefficient of the door outer panel 32 are different, a difference in thermal expansion arises between the annular RF 34 and the door outer panel 32 at the time of painting on an assembly line of the door outer assembly 30. In this case, there is the possibility that the joined portions of the annular RF 34 and the door outer panel 32 will separate, and that warping will arise that the door outer panel 32.

Here, as described above, the door outer panel 32 and the annular RF 34 are formed of the same type of metal (are formed of aluminum). Therefore, the linear expansion coefficient of the door outer panel 32 and the linear expansion coefficient of the annular RF 34 can be made to be the same. Accordingly, even if the door outer assembly 30 is exposed to high temperatures at the time of painting on an assembly line of the side door 20, a difference in thermal expansion arising between the annular RF 34 and the door outer panel 32 can be suppressed. Due to the above structure, the joined portions of the annular RF 34 and the door outer panel 32 separating can be suppressed, and warping arising at the door outer panel 32 can be suppressed. Accordingly, the door outer assembly 30 (the side door 20) can be painted on an assembly line well.

Then, after the door outer assembly 30 is painted on-line, the door inner assembly 50 is fastened and fixed to the annular RF 34 of the door outer assembly 30. Due to the above structure, the door inner panel 52, that is made of a fiber-reinforced resin, is fixed to the door outer assembly 30.

In this way, at the vehicle door structure S relating to the present embodiment, the annular RF 34 that is made of a metal (is made of aluminum) is joined to the door outer panel 32 that is made of a metal (is made of aluminum), and the door outer assembly 30 is set into the state of being an assembly, and the door outer assembly 30 is connected to a vehicle main body at the annular RF 34. Moreover, at the vehicle door structure S, the door inner panel 52 that is made of a fiber-reinforced resin is fastened and fixed to the annular RF 34. Therefore, as described above, the side door 20 can be painted on an assembly line in a state in which the door inner panel 52 is removed from the door outer assembly 30 (in other words, before the door inner panel 52 is fastened and fixed to the door outer assembly 30). Then, after the side door 20 is painted on-line, the door inner panel 52 can be assembled (fastened and fixed) to the annular RF 34.

At the vehicle door structure S, as described above, the annular RF 34 is joined to the door outer panel 32, and the annular RF 34 is assembled to the vehicle main body via the upper hinge 64 and the lower hinge 68. Therefore, for example, by causing the annular RF 34 that is made of a metal (made of aluminum) to deform plastically, the side door 20 can be assembled to the vehicle main body while the position and the like of the side door 20 with respect to the vehicle main body is finely adjusted. This point is described hereinafter by comparison with a comparative example in which the annular RF 34 is omitted. Namely, because the annular RF 34 is omitted in the comparative example, the door outer panel 32 is joined to the door inner panel 52, and the door inner panel 52 is connected to a vehicle main body via the upper hinge 64 and the lower hinge 68. Further, because the door inner panel 52 is made of a fiber-reinforced resin, the door inner panel 52 cannot be plastically deformed at the time of connecting the door inner panel 52 to the vehicle main body. Therefore, at the time of connecting the door inner panel 52 to the vehicle main body, it is difficult to finely adjust the position and the like of the side door 20 with respect to the vehicle main body.

In contrast, in the present embodiment, the annular RF 34 that is made of metal (is made of aluminum) is assembled to the vehicle main body via the upper hinge 64 and the lower hinge 68. Thus, at the time of connecting the door inner panel 52 to the vehicle main body, by plastically deforming the annular RF 34 that is made of metal (is made of aluminum), the position and the like of the side door 20 with respect to the vehicle main body can be finely adjusted. Accordingly, even in a case in which the door inner panel 52 is made of a fiber-reinforced resin, the side door 20 can be assembled to the vehicle main body while the position and the like of the side door 20 with respect to the vehicle main body are finely adjusted.

Further, the annular RF 34, the beltline outer RF 36, the first bracket 44, the hinge retainer lower 66 and the hinge retainer upper 62 are respectively made of metal (made of aluminum). Therefore, as compared with the above-described comparative example, the occurrence of screw-loosening of the bolts B1 for hinge fixing can be suppressed. Namely, in the above-described comparative example, the hinges are fixed to the hinge retainer upper and the hinge retainer lower by the bolts B1 for hinge fixing and the nuts Ni for hinge fixing, via the door inner panel 52 that is formed of a fiber-reinforced resin. Thus, when creeping arises at the door inner panel 52 due to the fastening force caused by the bolts B1 for hinge fixing and the nuts N1 for hinge fixing, there is the possibility that screw-loosening will arise at the bolts B1 for hinge fixing. In contrast, in the present embodiment, because the annular RF 34 is made of metal (made of aluminum), it is difficult for creeping to arise at the annular RF 34. Due to the above structure, the occurrence of screw-loosening of the bolts B1 for hinge fixing can be suppressed, as compared with the above-described comparative example.

Further, in the present embodiment, there is a structure in which the door inner panel 52 is fastened and fixed to the annular RF 34. Thus, functional parts, such as the door lock device that is fixed to the lock RF 56 of the door inner panel 52 and an unillustrated regulator assembly and the like, are assembled from the door outer side, and thereafter, the door inner panel 52 can be fastened and fixed to the annular RF 34. Due to the above structure, the ability to assemble the side door 20 can be improved. Further, the service holes 52A that are formed in the door inner panel 52 can be reduced (made to be smaller). Namely, usually, a relatively large service hole must be formed in the substantially central portion of the door inner panel 52 in order to mount the aforementioned regulator assembly and the like. In contrast, in the present embodiment, because the regulator assembly can be assembled from the door outer side, this service hole can be omitted. As a result, the rigidity at the side door 20 can be improved, and the NV characteristic of the side door 20 can be improved.

Moreover, in the present embodiment, the door inner panel 52 is made of a fiber-reinforced resin, and the door trim 74 is disposed at the door inner side of the door inner panel 52. Therefore, compactness of the door trim 74 can be devised by forming the door inner panel 52 such that the door inner panel 52 structures a portion of the door trim 74.

[Supplemental Description of Embodiment]

Note that, in the present embodiment, the door outer panel 32 and the annular RF 34 are made of the same type of metal (are made of aluminum), but the door outer panel 32 and the annular RF 34 may be formed from different types of metals. In this case, because the linear expansion coefficient of the door outer panel 32 and the linear expansion coefficient of the annular RF 34 are different, a difference in thermal expansion arises between the both at the time of painting on an assembly line, but a structure that absorbs this difference in thermal expansion may be provided separately.

Further, in the present embodiment, the beltline outer RF 36, the dent RF 40 and the impact beam 42, that serve as reinforcing members and that extend in the door longitudinal direction, are joined to the annular RF 34 in a state of being superposed, from the door outer side, on the bottom wall 34A or the flange 34B of the annular RF 34. However, the present disclosure is not limited to this. For example, a reinforcing member that extends in the door longitudinal direction may be joined to the annular RF 34 in a state of being superposed, from the door inner side, on the bottom wall 34A of the annular RF 34.

What is claimed is:

1. A vehicle door structure comprising:
   a metal door outer panel that includes an outermost design surface of a vehicle door;
   a metal annular reinforcement that (i) is provided at a door inner side of the door outer panel, (ii) has an annular shape so as to extend along an outer peripheral portion of the door outer panel, and (iii) is joined to the outer peripheral portion of the door outer panel;
   at least one reinforcing member including a dent reinforcement that (a) extends in a door longitudinal direction, (b) is joined to the annular reinforcement, and (c) is disposed so as to span over a door vertical direction intermediate portion of the vehicle door at an opening of the annular reinforcement; and
   a fiber-reinforced resin door inner panel that is provided at a door inner side of the annular reinforcement, and is fastened to the annular reinforcement,
   wherein a rear portion of the dent reinforcement is inclined toward the door inner side at an angle between 0 degrees and 90 degrees.

2. The vehicle door structure of claim 1,
   wherein the at least one reinforcing member includes a beltline outer reinforcement that is provided at an upper end portion of the vehicle door;
   the vehicle door structure further comprising a hinge retainer upper that is fixed to a front end portion of the beltline outer reinforcement,
   wherein the front end portion of the beltline outer reinforcement, the hinge retainer upper, the annular reinforcement, and an upper hinge that is fixed to a vehicle main body, are fastened together by a fastening member.

3. The vehicle door structure of claim 1,
   wherein the at least one reinforcing member includes a beltline outer reinforcement that is provided at an upper end portion of the vehicle door;
   the vehicle door structure further comprising a metal lock reinforcement that is provided at a door outer side of a door rear portion of the door inner panel, and to which a door lock device is mounted,
   wherein a rear end portion of the beltline outer reinforcement, the annular reinforcement, the door inner panel and the lock reinforcement are fastened together by a fastening member.

4. The vehicle door structure of claim 1,
   wherein the at least one reinforcing member includes a beltline outer reinforcement that is provided at an upper end portion of the vehicle door;
   the vehicle door structure further comprising a metal lock reinforcement that is provided at a door outer side of a door rear portion of the door inner panel, and to which a door lock device is mounted; and
   a handle reinforcement that is integral with the beltline outer reinforcement, and to which an outside handle of the vehicle door is fixed, wherein the handle reinforcement, the annular reinforcement, the lock reinforcement and the door inner panel are fastened together by a fastening member.

5. The vehicle door structure of claim 1,
further comprising a metal lock reinforcement that is provided at a door outer side of a door rear portion of the door inner panel, and to which a door lock device is mounted, wherein
a front end portion of the dent reinforcement is welded to the annular reinforcement, and
a rear end portion of the dent reinforcement, the annular reinforcement, the lock reinforcement and the door inner panel are fastened together by a fastening member.

6. The vehicle door structure of claim 1,
wherein the at least one reinforcing member further includes an impact beam that is provided further downward than the dent reinforcement;
the vehicle door structure further comprising a first bracket and a second bracket that are fastened to a front end portion of the impact beam; and
a hinge retainer lower that is fixed to a front end portion of the first bracket,
wherein the first bracket is welded to the annular reinforcement,
a front end portion of the second bracket is welded to the annular reinforcement, and
the front end portion of the first bracket, the hinge retainer lower, the annular reinforcement, and a lower hinge that is fixed to a vehicle main body, are fastened together by a fastening member.

7. The vehicle door structure of claim 1,
wherein the at least one reinforcing member further includes an impact beam that is provided further downward than the dent reinforcement;
the vehicle door structure further comprising a rear bracket that is fastened to a rear end portion of the impact beam; and
a metal lock reinforcement that is provided at a door outer side of a door rear portion of the door inner panel, and to which a door lock device is mounted,
wherein the rear bracket, the annular reinforcement, the lock reinforcement and the door inner panel are fastened together by a fastening member.

8. The vehicle door structure of claim 1, wherein a front end of the dent reinforcement is attached to a front portion of the annular reinforcement, and a rear end of the dent reinforcement is attached to a rear portion of the annular reinforcement.

9. The vehicle door structure of claim 8, wherein the at least one reinforcing member further includes an impact beam that is provided further downward than the dent reinforcement.

10. The vehicle door structure of claim 1, wherein the at least one reinforcing member includes a beltline outer reinforcement that is provided at an upper end portion of the vehicle door.

11. The vehicle door structure of claim 10, wherein the beltline outer reinforcement is coextensive with at least a portion of an upper portion of the annular reinforcement.

12. The vehicle door structure of claim 1, wherein
a vehicle front end portion of the dent reinforcement overlaps a door vertical direction intermediate portion of a vehicle front end portion of the annular reinforcement, and
a vehicle rear end portion of the dent reinforcement overlaps a door vertical direction intermediate portion of a vehicle rear end portion of the annular reinforcement.

13. A vehicle door structure comprising:
a metal door outer panel that includes an outermost design surface of a vehicle door;
a metal annular reinforcement that (i) is provided at a door inner side of the door outer panel, (ii) has an annular shape so as to extend along an outer peripheral portion of the door outer panel, and (iii) is joined to the outer peripheral portion of the door outer panel;
at least one reinforcing member that extends in a door longitudinal direction and that is joined to the annular reinforcement; and
a fiber-reinforced resin door inner panel that is provided at a door inner side of the annular reinforcement, and is fastened to the annular reinforcement,
wherein the annular reinforcement includes a bottom wall that defines a lower edge of an opening of the annular reinforcement, an entirety of the bottom wall being disposed at a door outer side of a lifting trajectory of a door glass of the vehicle door.

* * * * *